(12) United States Patent
Wu

(10) Patent No.: US 11,857,050 B2
(45) Date of Patent: Jan. 2, 2024

(54) SMART LUGGAGE CASE AND A METHOD FOR CONTROLLING THE OPERATION OF AN ASSISTING LUGGAGE CASE

(71) Applicant: Changzhou Airwheel Technology Co., Ltd., Changzhou (CN)

(72) Inventor: Yan Wu, Changzhou Jiangsu (CN)

(73) Assignee: Changzhou Airwheel Technology Co., Ltd., Jiangsu (CN)

( * ) Notice: Subject to any disclaimer, the term of this patent is extended or adjusted under 35 U.S.C. 154(b) by 1227 days.

(21) Appl. No.: 16/449,688

(22) Filed: Jun. 24, 2019

(65) Prior Publication Data
US 2019/0387851 A1 Dec. 26, 2019

(51) Int. Cl.
| A45C 5/14 | (2006.01) |
| A45C 5/03 | (2006.01) |
| A45C 13/26 | (2006.01) |
| G05D 1/02 | (2020.01) |

(52) U.S. Cl.
CPC ............... *A45C 5/14* (2013.01); *A45C 5/03* (2013.01); *A45C 5/146* (2013.01); *A45C 13/262* (2013.01); *G05D 1/0212* (2013.01); *G05D 1/0234* (2013.01); *A45C 2013/267* (2013.01); *B60B 2200/45* (2013.01)

(58) Field of Classification Search
CPC .. A45C 5/14; A45C 5/03; A45C 5/146; A45C 13/262; A45C 2013/267; A45C 15/00; A45C 2005/148; A45C 2200/20; G05D 1/0212; G05D 1/0234; B60B 2200/45
See application file for complete search history.

(56) References Cited

U.S. PATENT DOCUMENTS

| 2010/0161163 A1 | 6/2010 | Chang | |
| 2016/0255928 A1* | 9/2016 | O'Donnell | ............... A45C 5/14 |
| 2019/0113382 A1* | 4/2019 | Ren | ........................ G01G 23/18 |

FOREIGN PATENT DOCUMENTS

| CN | 102416863 A | 4/2012 |
| CN | 202987422 U | 6/2013 |
| CN | 104834520 A | 8/2015 |

(Continued)

OTHER PUBLICATIONS

Extended European Search Report dated Mar. 6, 2020 for European Patent Application 19182002.6.

(Continued)

*Primary Examiner* — Richard M Camby
(74) *Attorney, Agent, or Firm* — McCarter & English, LLp

(57) ABSTRACT

The present application discloses a smart luggage case and a method for controlling the operation of the assisting luggage case, wherein, the smart luggage case comprises a case body, an auxiliary wheel mounted on the bottom of the case body, a power wheel elevatably mounted on the bottom of the case body, a swinging device connected to the power wheel, and a driving mechanism configured to drive the swinging device to swing and elevate the power wheel; another smart luggage case comprises a case body, a power wheel mounted on the case body, a tension bar provided with a wireless controller signally connected to the control system and configured to control the power wheel, a control system connected to the power wheel and a battery connected to the control system.

11 Claims, 19 Drawing Sheets

(56) References Cited

FOREIGN PATENT DOCUMENTS

| CN | 105223800 A | 1/2016 |
|---|---|---|
| CN | 205285352 U | 6/2016 |
| CN | 205335917 U | 6/2016 |
| CN | 205389272 U | 7/2016 |
| CN | 106428395 A | 2/2017 |
| CN | 107198320 A | 9/2017 |
| CN | 107422740 A | 12/2017 |
| CN | 107830922 A | 3/2018 |
| CN | 108143065 | 6/2018 |
| CN | 108143065 A | 6/2018 |
| GB | 2426963 A | 12/2006 |
| WO | WO 2016/141091 A1 | 9/2016 |
| WO | WO 2017/067107 | 4/2017 |
| WO | WO 2017/067107 A1 | 4/2017 |

OTHER PUBLICATIONS

Chinese Office Action dated Mar. 11, 2020 for Chinese Patent Application 201810651902.X.

* cited by examiner

SMART LUGGAGE CASE AND A METHOD FOR CONTROLLING THE OPERATION OF AN ASSISTING LUGGAGE CASE

CROSS REFERENCE

This application claims the benefits of Chinese priority application filed on Jun. 22, 2018, with the application number CN 201810651902.X, and the Chinese priority application filed on Aug. 8, 2018, with the application number CN 201810895866.1, and the Chinese priority application filed on Aug. 8, 2018, with the application number CN 201810896546.8, which are herein incorporated by reference in its entirety.

TECHNICAL FIELD

The present application relates to a luggage case, and more particularly to a smart luggage case with a power wheel elevatably mounted on the bottom of the case body, a smart luggage case with wireless control function, and a method for controlling the operation of assisting luggage case.

BACKGROUND

In one aspect, there are two types of luggage cases in the existing market. For example: a normal luggage case moved manually or a luggage case moved electrically. The normal luggage case is moved by dragging the tension bar, and does not have the function of being moved electrically. The electric luggage case is moved by the electric wheel and usually can't be moved through manual force. Therefore, a luggage case that can either be moved manually or moved electrically is expected by the consumers. In order to realize the technical effect of above mentioned luggage case that the luggage case can either be moved manually or moved electrically, innovative improvement on the walking structure of the luggage can be made by the manufacturer.

In another aspect, the assisting luggage in the existing market comprises a case body, a control portion mounted on the tension bar, a control system mounted on the case body, and a power wheel mounted on the bottom of the case body. The control portion is signally connected to the control system, and the signal line is introduced into the control system through the hollow portion of the tension bar, and the power wheel is driven to rotate by the control system. When the user uses the control portion to control the movement of the luggage, the tension bar needs to be pulled up to the corresponding height to adapt to the grasping posture of the user, and the tension bar needs to be reset to the inside of the luggage case when the luggage case is stored. The tension bar in the raised position is likely to sway to the left or right sides of the case body during the manipulation process. The tension bar is repeatedly pulled up and down and swayed from side to side, and this cause the signal line to break and the welding head to fall off, and then the signal disappears and the luggage case cannot be moved electrically. How to improve the stability of signal control needs to be improved.

In another aspect, the existing assisting luggage case comprises a case body, a power wheel, a tension bar, and a control system. The tension bar has a control portion for controlling the speed of the luggage case, and the control portion is provided with a displacement member connected to the spring. The control portion is signally connected to the control system, and the control system drives the power wheel to rotate according to the manipulation information from the user pressing the displacement member. The assisting luggage case saves the user's physical strength by driving the case electrically. The user can press and hold the displacement member according to the operating environment to overcome the force of the spring and prevent the displacement member from being reset to the initial position by the spring force which leads to the movement of the assisting luggage being out of control. In addition, a speed adjustment gear mounted on control portion is required to be adjusted by the user according to the operating environment to control the movement of the assisting luggage case. In order to further improve the user experience, the operation control mode of the assisting luggage has yet to be improved.

SUMMARY

In one aspect, The technical problem of the present application to be solved is how to improve the walking structure of the assisting luggage case to realize the technical effect that the luggage can be moved manually or driven electrically.

In order to solve the above technical problem, the present application provides the following technical solution:

A smart luggage case comprises: a case body; an auxiliary wheel mounted on the bottom of the case body; a power wheel elevatably mounted on the bottom of the case body; a swinging device connected to the power wheel, and a driving mechanism configured to drive the swinging device to swing and elevate the power wheel, wherein, the swinging device comprises a first swinging piece, a second swinging piece pivotally connected to the first swinging piece, and a resilient member connected between the first swinging piece and the second swinging piece and configured to drive the second swinging piece to swing, relative to the first swinging piece, to the lower portion of the case body; and the driving mechanism is connected to the first swinging piece, and the power wheel is mounted on the second swinging piece.

Compared with the prior art, the present application has the following beneficial effects: the bottom of the smart luggage case of the present application is mounted with an auxiliary wheel and a power wheel that can drive the auxiliary wheel to rotate. When the driving mechanism drives the first swinging piece of the swinging device to swing, the power wheel mounted on the second swinging piece can be driven to be elevated relative to the case body. The power wheel can maintain the state of swinging toward the ground by the force of the resilient member during the ascent or descent process. When the power wheel descends with respect to the case body, the power wheel can abut against the ground and support the case body together with the auxiliary wheel, and the auxiliary wheel rotates following the power wheel. At this time, the smart luggage is in the electric drive mode, and the smart bag is driven by the power wheel. When the power wheel rises with respect to the case, the power wheel can be separated from the ground, and the smart luggage is supported on the ground by the auxiliary wheel, and at this time, the smart luggage is in the manual moving mode, and the smart luggage is moved or pulled by the user.

The driving mechanism drives the swinging device to adjust the height of the power wheel with respect to the ground, so that the smart luggage can be conveniently switched between the electric driving mode and the manual moving mode, thereby improving the user's experience. In addition, when the smart luggage moves on the uneven ground, the reaction force from the ground to the power wheel and the force of the resilient member make the power wheel always abut against the uneven ground which generates friction to the ground. The power wheel can adjusts upward or downward the swinging angle of the second swinging piece with respect to the first swinging piece timely to maintain the power wheel in contact with the ground according to the change of the reaction force of the ground to the power wheel, thereby improving the operational stability of the smart luggage.

Preferably, the resilient member is located below a pivotal joint of the first swinging piece and the second swinging piece.

Preferably, the first swinging piece is provided with a limitation member to restrict the second swinging piece from swinging, relative to the first swinging piece, to the lower portion of the case body, and the limitation member is located below the pivotal joint and above the resilient member.

Preferably, the swinging device is provided with a fine adjustment member which is used for adjusting the relative swinging angle when the second swinging piece is swinging, relative to the first swinging piece, to the lower portion of the case body; and the fine adjustment member comprises a bolt threadedly connected to the first swinging piece and configured to abut the second swinging piece, and the second swinging piece is provided with a resistant block located below the pivotal joint to allow the bolt to abut thereto.

Preferably, the driving mechanism comprises: an electric motor, and a rotating shaft connected to a output shaft of the electric motor, wherein one end of the rotating shaft is fixedly connected to the first swinging piece, the other end of the rotating shaft is connected to the electric motor output shaft; and the first swinging piece swings about the rotating shaft.

Preferably, the first swinging piece comprises: a main body portion connected to the driving mechanism, a rotating shaft connecting portion fixed to the main body portion and connected to the rotating shaft, a hinge portion fixed to the main body portion and hinged to the second swinging piece wherein the hinge portion swings about the rotating shaft connecting portion, and a lug portion projecting downward from the main body portion and connecting the resilient member.

Preferably, a first limitation switch and a second limitation switch both signally connected to the electric motor are respectively disposed on two sides of the first swinging piece.

Preferably, the electric motor output shaft is provided with a first gear, and the rotating shaft is provided with a second gear engaged with the first gear; or the electric motor is a gear motor, the output shaft of which is connected to the rotating shaft through a coupling.

Preferably, the smart luggage case comprises two swinging devices connected to the driving mechanism.

Preferably, the case body comprises: a first body configured for storing, a second body configured for mounting a swinging device and a driving mechanism, wherein the second body is fixedly connected to the lower end of the first body.

In another aspect, another technical problem to be solved by the present application is to provide a smart luggage with wireless control function.

In order to solve the above technical problem, the present application provides the following technical solution:

A smart luggage case, comprises: a case body, a power wheel mounted on the case body, a tension bar provided with a wireless controller signally connected to the control system and configured to control the power wheel, a control system connected to the power wheel and a battery connected to the control system.

Compared with the prior art, the present application has the following beneficial effects: a wireless controller is installed on the tension bar of the smart luggage case of the present application, and the controller transmits the control signal to the control system by wireless communication, and the control system drives the smart luggage case according to the control signal. Compared with the wired communication which has a signal line in the tension bar, the wireless communication is convenient to be installed, and can keep the signal communication fluent and stable in operation.

Preferably, the wireless controller comprises: a button area, a touch sensing module connected to the button area, a signal processing module connected to the touch sensing module, and a wireless communication module connected to the signal processing module, wherein the wireless communication module is signally connected to the control system.

Preferably, the button area is provided a flexible button or a liquid crystal touch screen.

Preferably, the wireless communication module comprises: an ultra-wideband wireless communication module, a Bluetooth wireless communication module, an ultrasonic wireless communication module or an infrared wireless communication module.

Preferably, the smart luggage case further comprises:
i. an auxiliary wheel mounted on the bottom of the case body;
ii. a swinging device configured to control lifting and lowering of the power wheel, wherein the swinging device comprises a first swinging piece, a second swinging piece pivotally connected to the first swinging piece, and a resilient member connected between the first swinging piece and the second swinging piece and configured to drive the second swinging piece to swing, relative to the first swinging piece, to the lower portion of the case body; and
iii. a driving mechanism configured to drive the swinging device, wherein the driving mechanism is connected to the first swinging piece, and the power wheel is mounted on the second swinging piece.

Preferably, the resilient member is located below a pivotal joint of the first swinging piece and the second swinging piece.

Preferably, the first swinging piece is provided with a limitation member to restricting the second swinging piece from swinging, relative to the first swinging piece, to the lower portion of the case body, and the limitation member is located below the pivotal joint and above the resilient member.

Preferably, the swinging device is provided with a fine adjustment member which is used for adjusting the relative swinging angle when the second swinging piece is swinging, relative to the first swinging piece, to the lower portion of the case body; and the fine adjustment member comprises a bolt threadedly connected to the first swinging piece and configured to abut the second swinging piece, and the second swinging piece is provided with a resistant block located below the pivotal joint to allow the bolt to abut thereto.

Preferably, the driving mechanism comprises: an electric motor, and a rotating shaft connected to a output shaft of the electric motor, wherein one end of the rotating shaft is connected to the electric motor output shaft, the other end of the rotating shaft is fixedly connected to the first swinging piece; and the first swinging piece swings about the rotating shaft.

Preferably, the first swinging piece comprises: a main body portion connected to the driving mechanism, a rotating shaft connecting portion fixed to the main body portion and connected to the rotating shaft, a hinge portion fixed to the main body portion and hinged to the second swinging piece, wherein the hinge portion swings about the rotating shaft connecting portion, and a lug portion projecting downward from the main body portion and connecting the resilient member.

In a third aspect, the technical problem to be solved of the present application is to provide method for controlling the operation of assisting luggage case in the assisting operation mode.

In order to solve the above technical problem, the present application provides the following technical solution:

A method for controlling the operation of assisting luggage case comprises a power wheel, a sensor for detecting an operation parameter of the power wheel, and a control system, comprising the following steps:
 iv. by the sensor, detecting a first operation parameter of the power wheel in a first operating state and feeding back the first operation parameter to the control system;
 v. changing the operating state of the assisting luggage case to a second operating state by a user applying an external force to the assisting luggage case;
 vi. detecting a second operation parameter of the power wheel in a second operating state and feeding back the second operation parameter to the control system by the sensor;
 vii. by the control system, comparing the second operation parameter with the first operation parameter, and controlling the operation of the assisting luggage case according to a comparison value.

Compared with the prior art, the present application has the following beneficial effects: the sensor respectively detects a first operation state before applying an external force to the assisting luggage case and a second operation state after that at any time during the entire operation of the assisting luggage case of the present application from the start to the end, thereby forming a first operation parameter and a second operation parameter. The control system analyzes and compares the first operation parameter and the second operation parameter, and drives the power wheel of the assisting luggage case to rotate according to the analysis result so that the assisting luggage case can be moved forward, forward accelerated, forward decelerated, backward moved, backward accelerated, backward decelerated, moved uniformly or stopped. The operation control method is convenient to be operated, further increasing the experience of the user.

Preferably, the first operating state is an initial stationary state or a moving state during the operation of the assisting luggage case.

Preferably, the external force is a positive assisting force in the forward direction or a reverse assisting force in the backward direction.

Preferably, the first operation parameter and the second operation parameter comprise one of the following parameters: a rotation speed of the power wheel of the assisting luggage case, an acceleration speed during the operation, and power, current, and voltage of the electric motor.

Preferably, the first operation parameter is a first current value $I_1$, the second operation parameter is a second current value $I_2$, and the control system analyzes and compares the first current value $I_1$ and the second current value $I_2$, and drives the rotation of the power wheel of the assisting luggage case according to an analysis result.

Preferably, if $I_2 > I_1$, the rotation speed of the power wheel in the second operating state is greater than that in the first operating state, and the external force enables the assisting luggage case moves with increasing speed; the control system increases the rotation speed of the power wheel to the rotation speed of the power wheel corresponding to $I_2$ according to a comparison value of $I_1$ with $I_2$; If $I_2 < I_1$, the rotational speed of the power wheel in the second operating state is less than that of the power wheel in the first operating state, the external force causes the assisting luggage to be decelerated; the control system reduces the rotational speed of the power wheel to the rotation speed of the power wheel corresponding to $I_2$ according to a comparison value of $I_1$ with $I_2$.

Preferably, the control system is set with a predetermined current value $I_0$; the assisting luggage case changes to the second operating state from the initial stationary state by an external force exerted by an external factor; when $I_2 \leq I_0$, the assisting luggage case has a displacement change due to the external force, but the control system doesn't drive the power wheel to rotate, and the assisting luggage case doesn't move forward or backward by itself.

The present application also provides an assisting luggage case, comprising a case body, a power wheel mounted on a bottom of the case body, a control system for driving the rotation of the power wheel, and a sensor for detecting an operation parameter of the power wheel, wherein, the sensor is signally connected to the control system and configured to detect an operation parameter of the power wheel and feed back to the control system; and the assisting luggage case is operated according to the above method.

Preferably, the power wheel is a hub motor wheel and the sensor is mounted inside the hub motor wheel.

Preferably, four universal wheels and one power wheel are installed on the bottom of the case body, and the four universal wheels are respectively installed at four corners on the lower portion of the case body, and the power wheel is located among the four universal wheels.

DETAILED DESCRIPTION OF EMBODIMENTS

Figure 1:
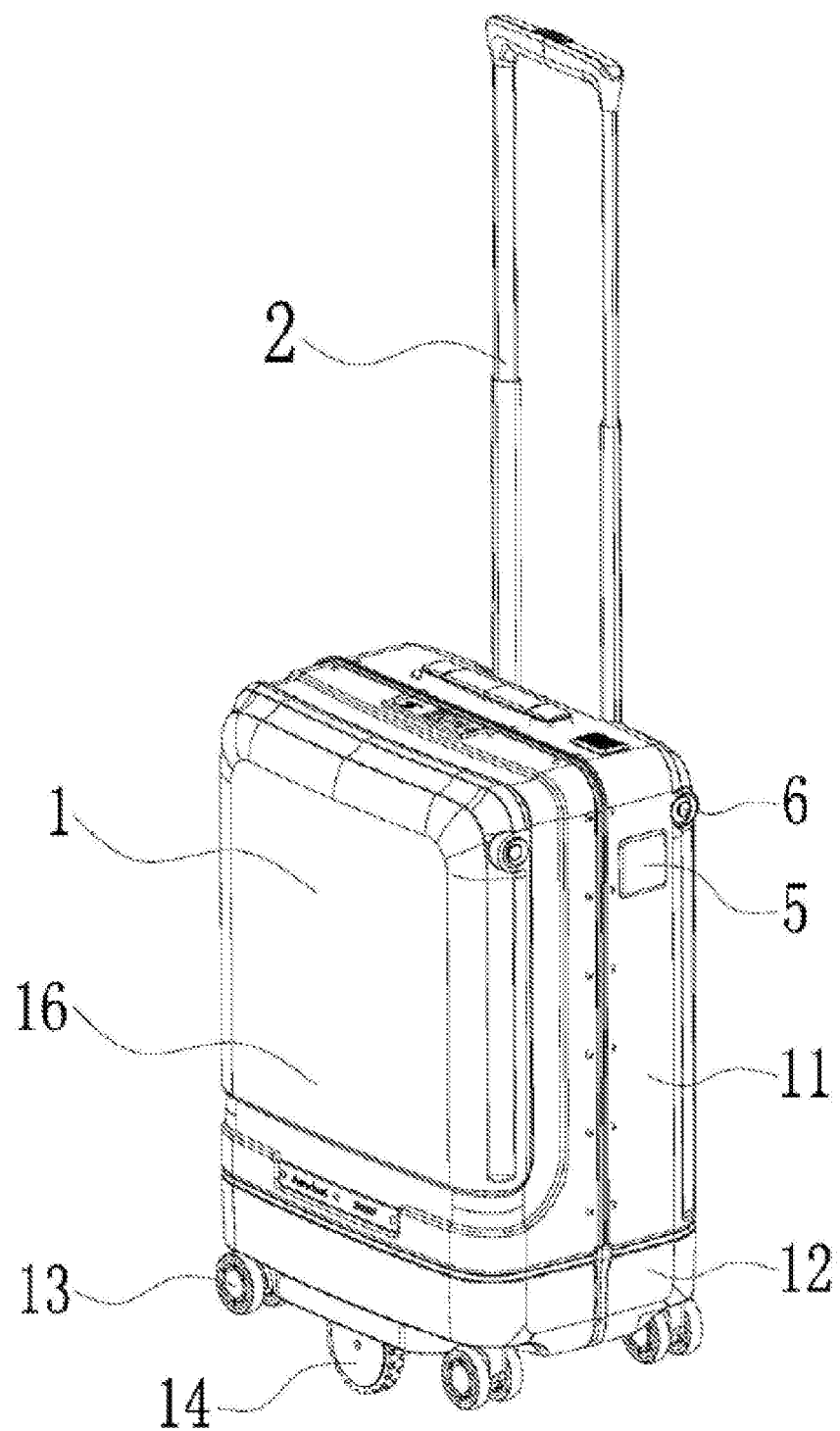
FIG. 1 is a perspective view of a smart luggage case of embodiment 1 of the present application at a first viewing angle.
Figure 2:
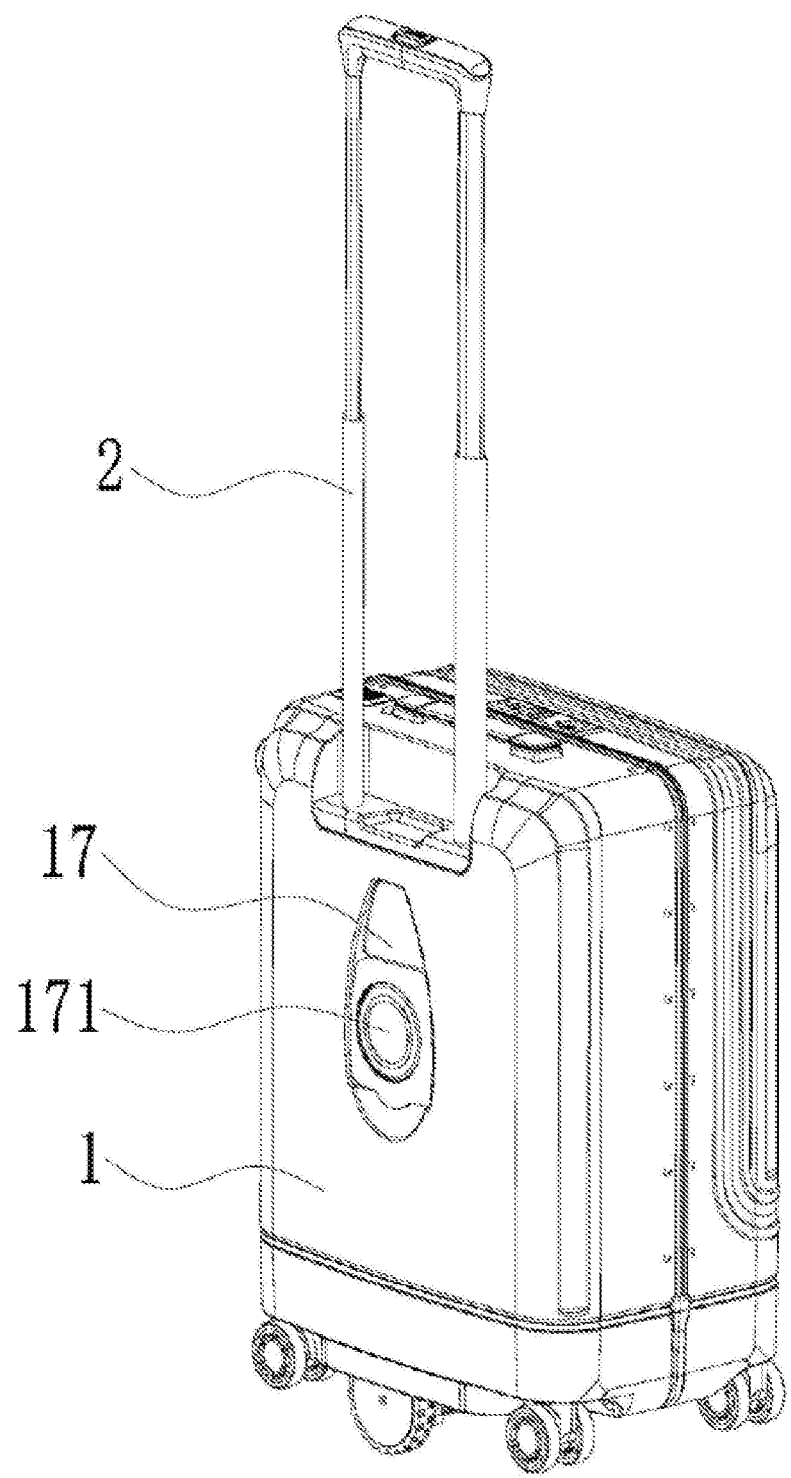
FIG. 2 is a perspective view of a smart luggage case according to embodiment 1 of the present application at a second viewing angle.

The embodiments of the present application are described in detail below with reference to the drawings, and are not intended to limit the scope of the application. It should be understood that in the description of the present application, the orientations or positional relationships represented by the terms "front", "back", "left", "right", "upper", "lower", etc. are based on the orientation or the positional relationship shown in the drawings and is merely for the convenience of the description of the present application and the simplification of the description, and is not intended to indicate or imply that the device or component referred to has a specific orientation and is constructed and operated in a specific orientation, and thus cannot to be construed as limiting the present application. The terms "first" and "second" are used merely to simplify the description of the text to distinguish it from the like, and cannot be understood as relationship with particular order.

Embodiment 1

Referring to FIG. 1 to FIG. 5, a smart luggage case in the embodiment comprises a case body 1, a tension bar 2 mounted on the case body 1, two auxiliary wheels 13 installed at the bottom of the case body 1, and two power wheel 14 which can be lifted up and down, two swinging devices 3 respectively mounted the two power wheels 14, the driving mechanism 4 connected to the two swinging devices 3 and driving the same, and the control system 15 and the battery mounted on the case body 1 (not shown). Each of the power wheels 14 is connected to a swinging device 3. The two swinging devices 3 are connected together to a driving mechanism 4. Each of the power wheels 14 comprises a wheel 141 and a driving motor 142 externally connected to the axle. The control system 15 is signally connected to the two driving motors 142 and controls the rotation direction and speed of the two driving motors 142. The auxiliary wheel 13 rotates following the power wheel 14. The auxiliary wheel 13 is a universal wheel. In other embodiments, the power wheel 14 can also be a hub motor wheel. The control system 15 is also signally connected to the driving mechanism 4 and controls the driving mechanism 4 to drive the two swing devices 3 to swing. When the driving mechanism 4 drives the two swinging devices 3 to swing, the power wheels 4 can be lifted up and down with respect to the case body 1. When the two power wheels 14 descend with respect to the case body 1, the two power wheels 4 can abut against the ground and support the case body 1 together with the four auxiliary wheels 13. The auxiliary wheel 13 driven by the power wheel 14, and the smart luggage case at this time is in the electrically driving mode and the smart luggage is driven by the power wheel 14. When the two power wheels 14 rise with respect to the case body 1, the two power wheels 14 can be separated from the ground, and the smart luggage is supported on the ground by the four auxiliary wheels 13, at this time the smart luggage case is in manual moving mode, and the smart luggage case is pushed or pulled to move by the user. The user use the driving mechanism 4 via the swinging device 3 to adjust the height of the power wheel 14 with respect to the ground, so that the smart luggage can be conveniently switched between the electric driving mode and the manual moving mode, thereby improving the user experience.

In this embodiment, the case body 1 comprises a first body 11 and a second body 12 located below the first body 11. The second body 12 is fixedly connected to the lower portion of the first body 11. The tension bar 2 is mounted on the first body 11, and the auxiliary wheel 13 and the power wheel 14 are both mounted on the second body 12. The first body 11 has a first receiving space to store items. The first body 11 is provided with a cover 16 to facilitate access to items. The battery is detachably connected to the inner side of the cover 16 of the first body 11, which is convenient for disassembly in security inspection and a smooth pass in the security check, and is convenient to separate the battery from the case body 1 for charging. The battery is a rechargeable battery or a dry battery. The battery is electrically connected to the power wheel 14, the control system 15, the driving mechanism 4, and other electronic devices on the case body 1 to provide power. A USB interface is mounted on the wall of the first body 11. The USB interface is wired to the battery to facilitate charging for a cell phone. In other embodiments, the battery can also be mounted on the outer wall of the case body 1. The side wall of the first body 11 on which the tension bar 2 is mounted is recessed with a recess 17 which is located between the two rods of the tension bar 2. A water cup holder 171 is mounted in the recess 17, and the water cup holder 171 is foldably hidden in the recess 17. The second body 12 has a second receiving space, and the two swinging devices 3, the driving mechanism 4 and the control system 15 are all mounted in the second receiving space. The first body 11 and the second body 12 are provided with through holes 18 for connecting the wires to facilitate the wired connection of the electronic device mounted on the first body 11 to the control system 15 mounted on the second body 12. In other embodiments, the electronic device mounted on the first body 11 can also be wirelessly connected to the control system 15 mounted on the second body 12. The first body 11 and the second body 12 are independently arranged in a modular manner, so that the structure is simple and the assembly is convenient, and dust can be prevented from entering the first body 11 from the second body 12, thereby ensuring the cleanliness of the storage items. In other embodiments, the case body 1 may not be divided into the first body 11 and the second body 12, and only a partition plate needs to be disposed between the upper portion and the lower portion of the case body 1.

In this embodiment, the second receiving space of the second body 12 is divided into a front receiving space 121 and a rear receiving space 122. The two swinging devices 3 and the driving mechanism 4 are mounted in the front receiving space 121, and the control system 15 is mounted in the rear receiving space 122. The bottom surface of the middle portion of the second body 12 is recessed with an intermediate receiving portion 123 for accommodating the two power wheels 14. The intermediate receiving portion 123 is located between the front accommodating space 121 and the rear accommodating space 122. The wall of the intermediate receiving portion 123 is provided with two openings 124 respectively which allow the swinging of the two swinging devices 3. The two openings 124 correspond to the upper portions of the two power wheels 14, respectively. The two swinging devices 3 can respectively penetrate through the two openings 124 and correspondingly connect the two power wheels 14 located at the intermediate receiving portion 123. Four auxiliary wheels 13 are respectively installed at the four corners of the bottom of the second body 12. The front and rear ends of the second body 12 are each provided with two auxiliary wheels 13. Two power wheels 14 are located between the two auxiliary wheels 13 at the front end and the two auxiliary wheels 13 at the rear end. The two power wheels 14 are oppositely disposed, and the axes of the two power wheels 14 are located on the same axis.

Figure 5:
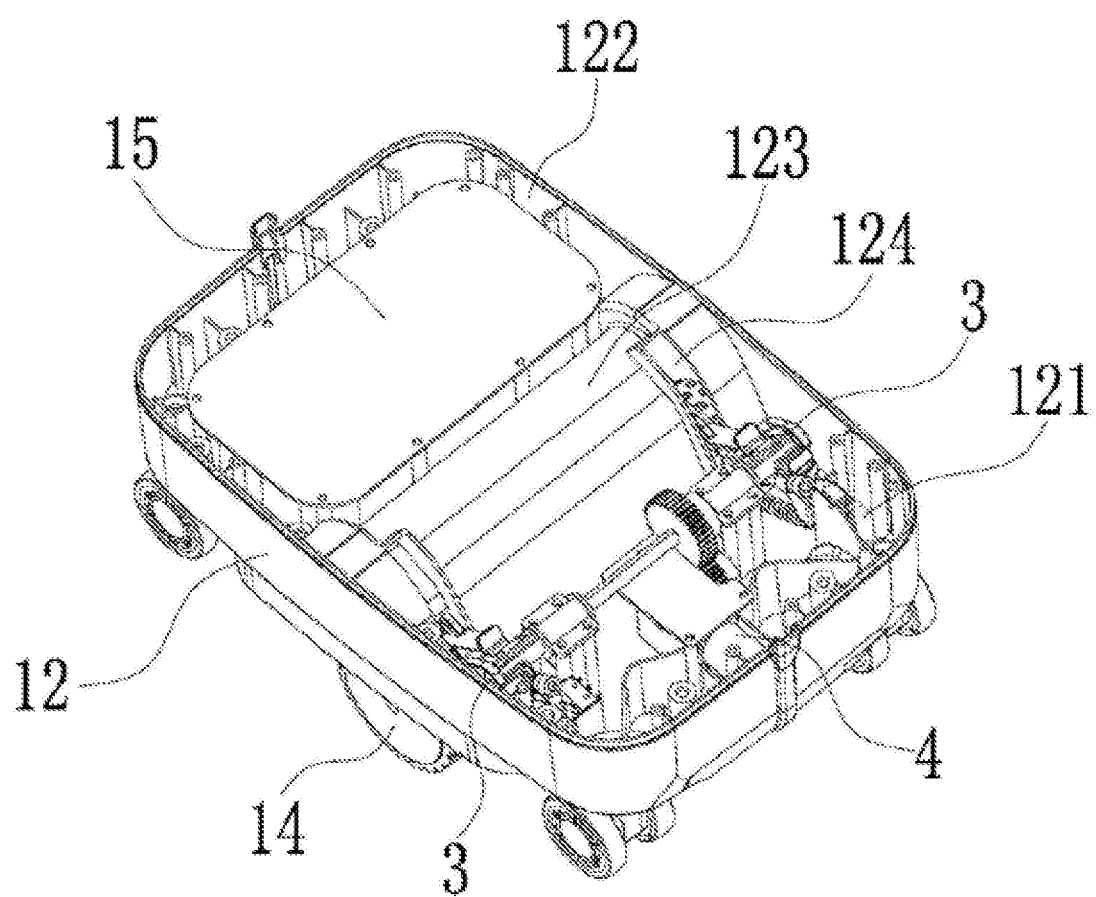
FIG. 5 is an internal perspective view of a second body of embodiment 1 at a first viewing angle.
Figure 6:
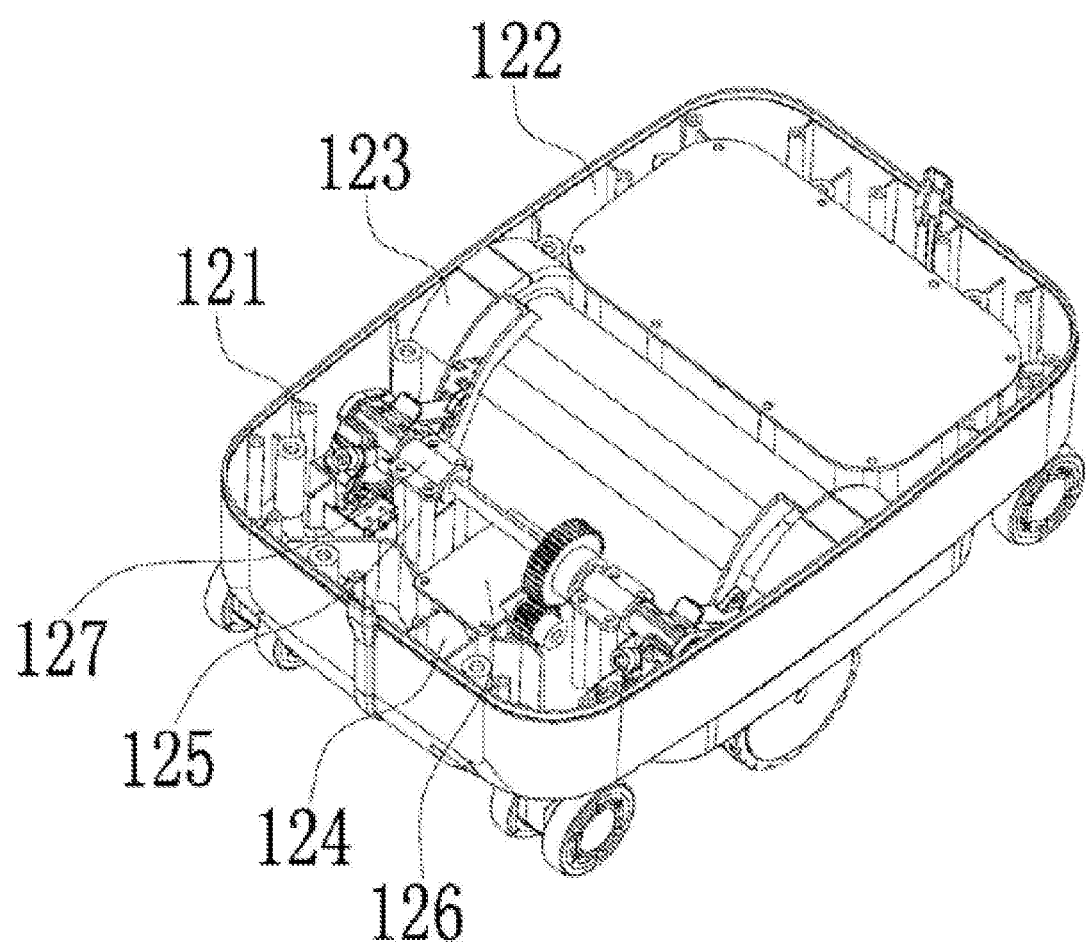
FIG. 6 is an internal perspective view of the second body of embodiment 1 at a second viewing angle.
Figure 7:
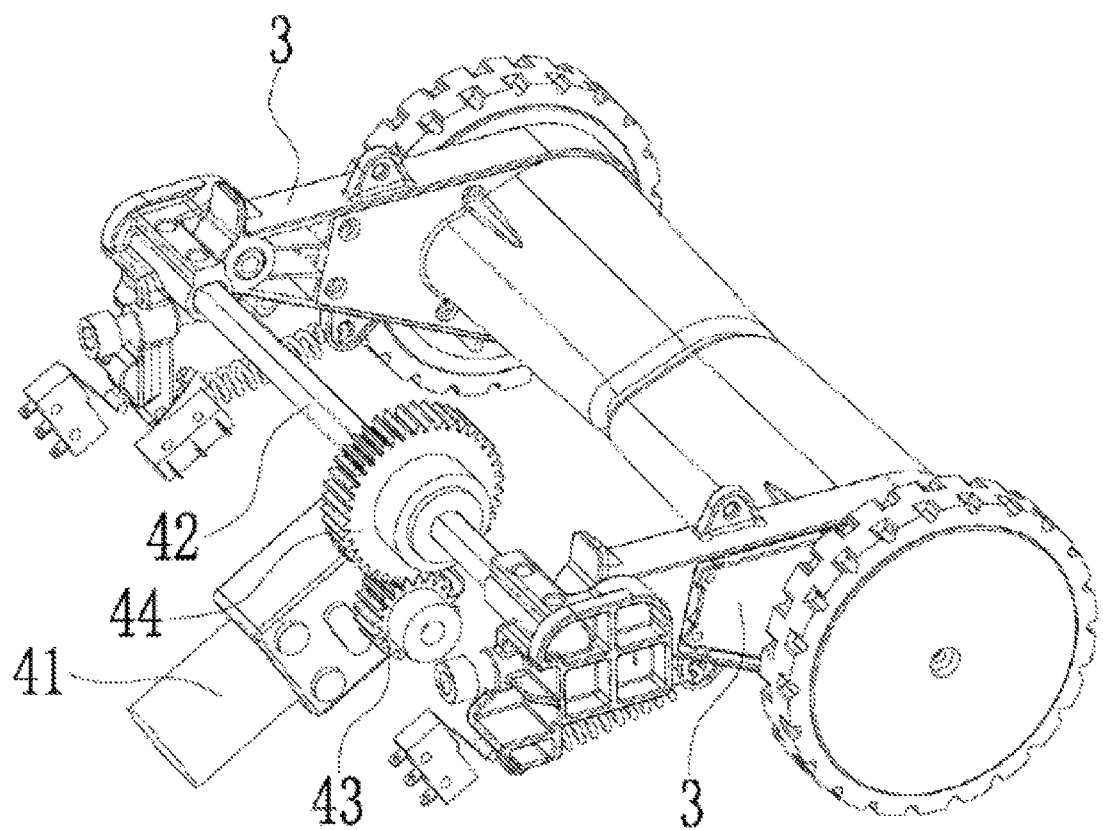
FIG. 7 is a perspective view of the driving mechanism connected with two swinging devices of embodiment 1.

Referring to FIGS. 5-7, in the present embodiment, the driving mechanism 4 comprises a electric motor 41 and a rotating shaft 42 connected to the output shaft of the electric motor. A first gear 43 is mounted on the electric motor output shaft, and a second gear 44 engaged with the first gear 43 is mounted on the rotating shaft 42. The control system 15 controls the rotation of the electric motor 41 to drive the rotation of the rotating shaft 42 by the gear transmission. The diameter of the second gear 44 is larger than the diameter of the first gear 43, so that the output speed of the electric motor 41 can be reduced. The front receiving space 121 is provided with a motor receiving groove 124 for mounting the electric motor 41 and a supporting base 125 for supporting the rotating shaft 42. The electric motor 41 is received in the electric motor receiving groove 124. A receiving groove cover 126 is provided at the opening of the receiving groove, so that the electric motor 41 can be fixedly mounted on the second body 12. The support base 125 extends from the bottom wall of the case body 1 to the lower portion of the rotating shaft 42, and the rotating shaft 42 is mounted on the supporting base 125 through a sleeve 127. The sleeve 127 is fixedly connected to the support base 125 by screws. The rotating shaft 42 is parallel to the axle of the power wheel 14. One end of the rotating shaft 42 is fixedly connected to one of the swinging devices 3, and the other end of the rotating shaft 42 is fixedly connected to the second gear 44 and extends through the second gear 44 toward the other swinging device 3, and then fixedly connected to the other swinging device 3. The extension portion of the other end of the shaft 42 is also mounted with a sleeve 127 on the support base 125. It should be noted that when the smart luggage case is only installed with one power wheel 14, that is the driving mechanism 4 only needs to be connected with one swinging device 3, then one end of the rotating shaft 42 needs to be fixedly connected to one swinging device 3, and the other end of the rotating shaft 42 is fixedly connected to the second gear 44.

Figure 8:
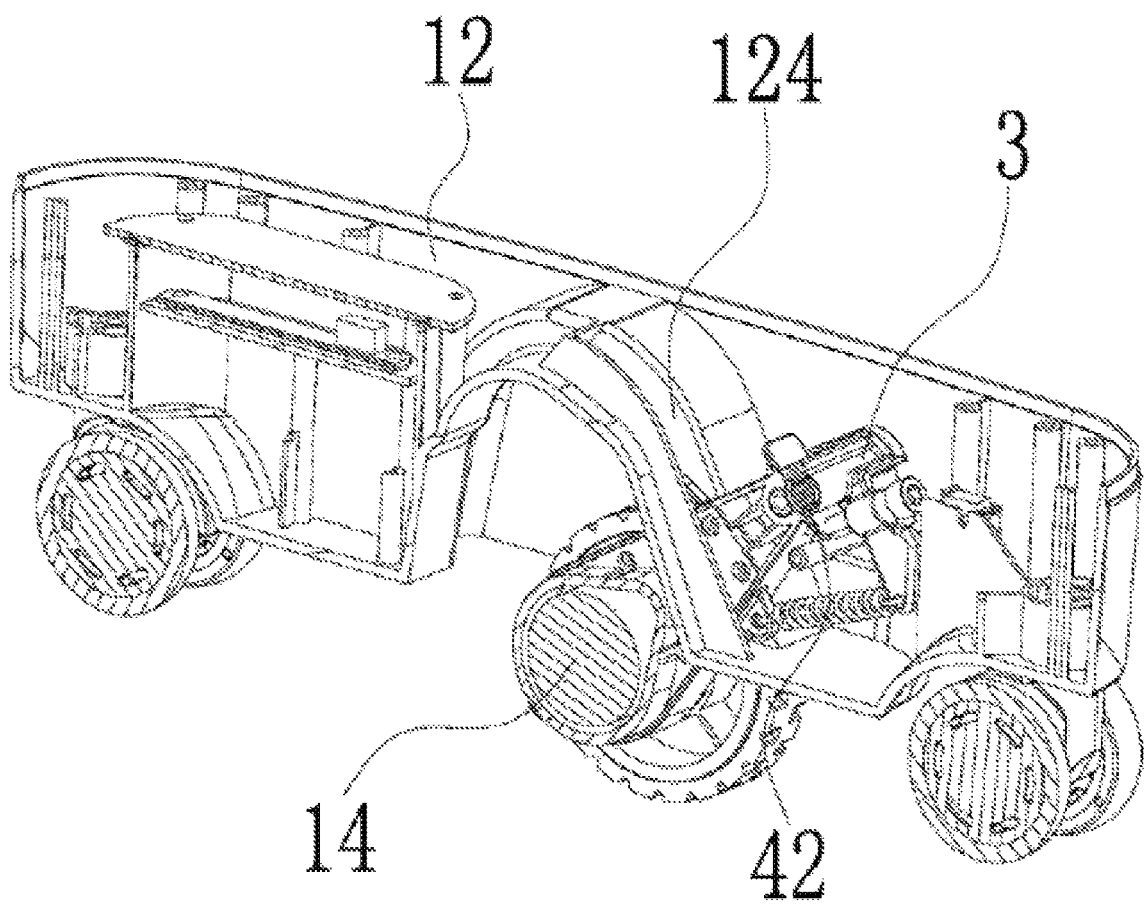
FIG. 8 is a schematic view of the connection between the swinging device and the second body in embodiment 1.
Figure 9:
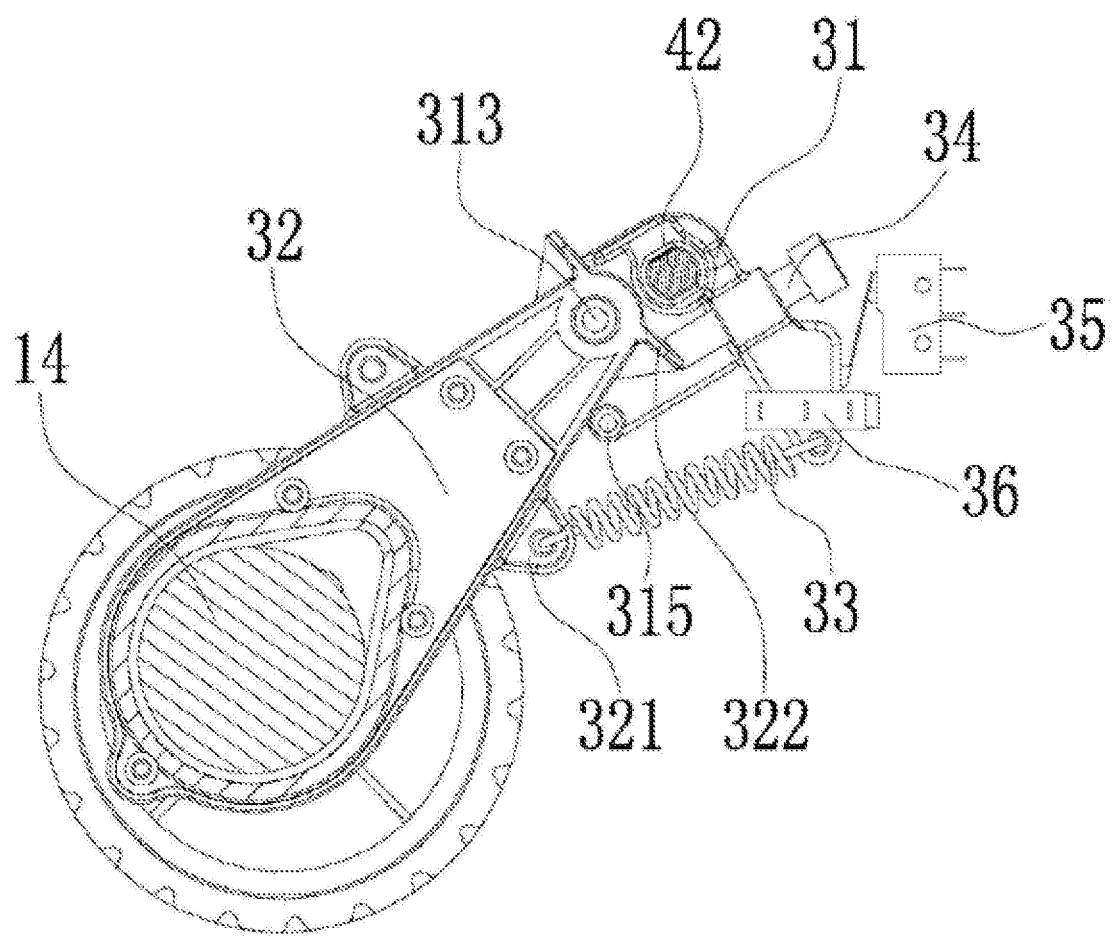
FIG. 9 is a schematic view of the connection between the swinging device and the power wheel in embodiment 1.
Figure 10:
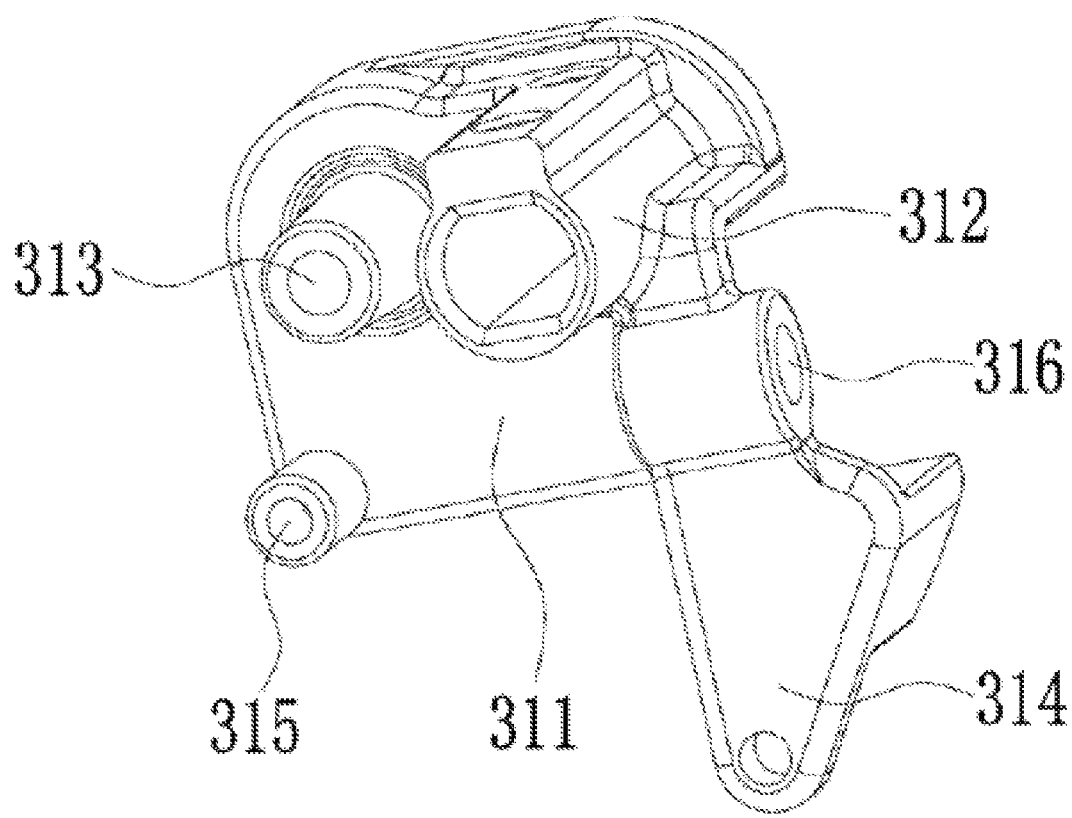
FIG. 10 is a perspective view of the first swinging piece in embodiment 1.

Referring to FIG. 8 to FIG. 10, in the present embodiment, the swinging device 3 comprises a first swinging piece 31, a second swinging piece 32 pivotally connected to the first swinging piece 31, and a resilient member 33 connected between the first swinging piece 31 and the second swinging piece 32 and configured to drive the second swinging piece 32 to swing, relative to the first swinging piece 31, to the lower portion of the case body 1. The second swinging piece 32 extends through the opening 124 formed in the wall of the intermediate receiving portion 123 of the second body 12 and connects the power wheel 14 located at the intermediate receiving portion 123.

Figure 11:
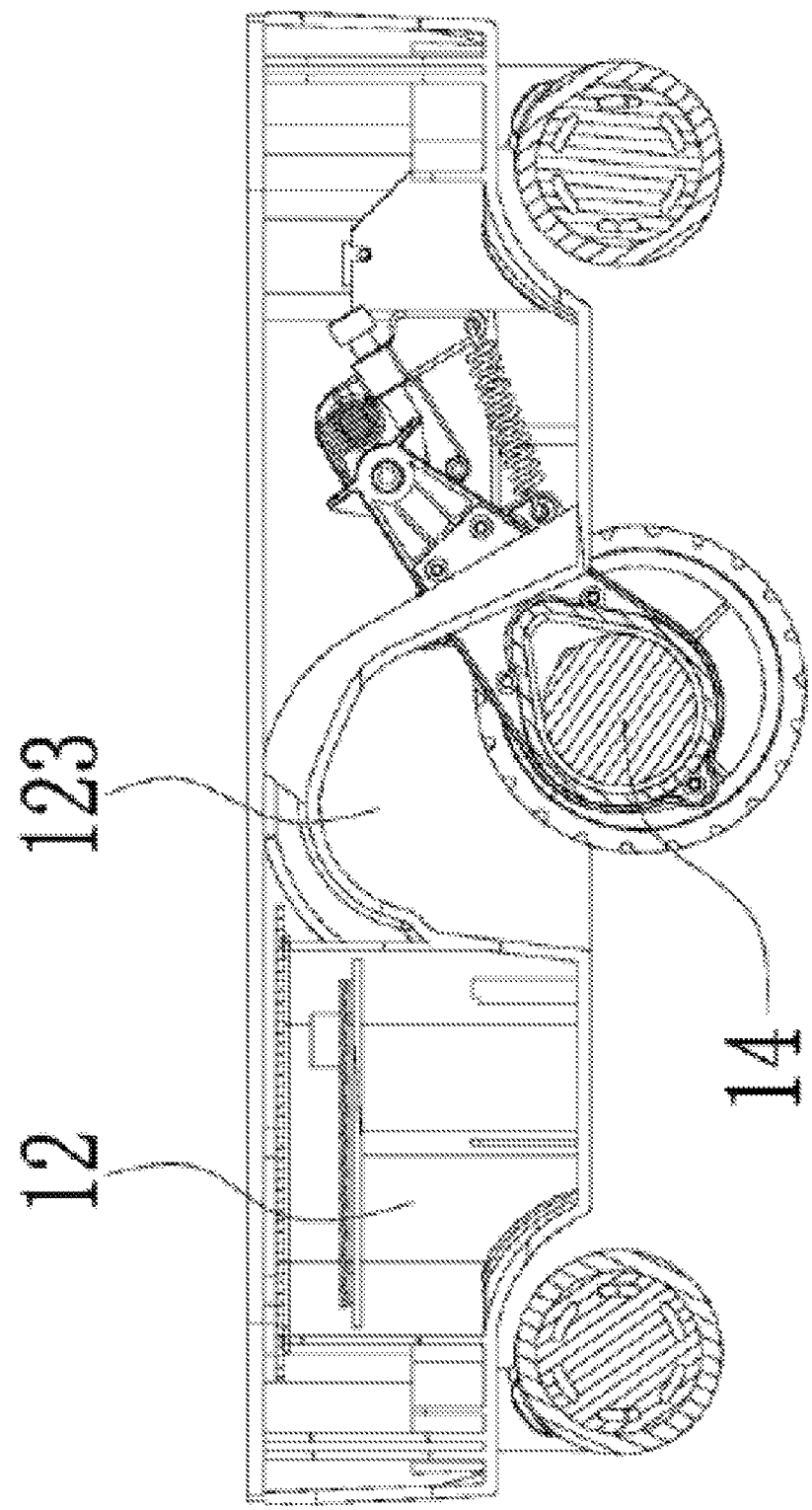
FIG. 11 is a schematic view showing the power wheel protruding out of the case body in embodiment 1.
Figure 12:
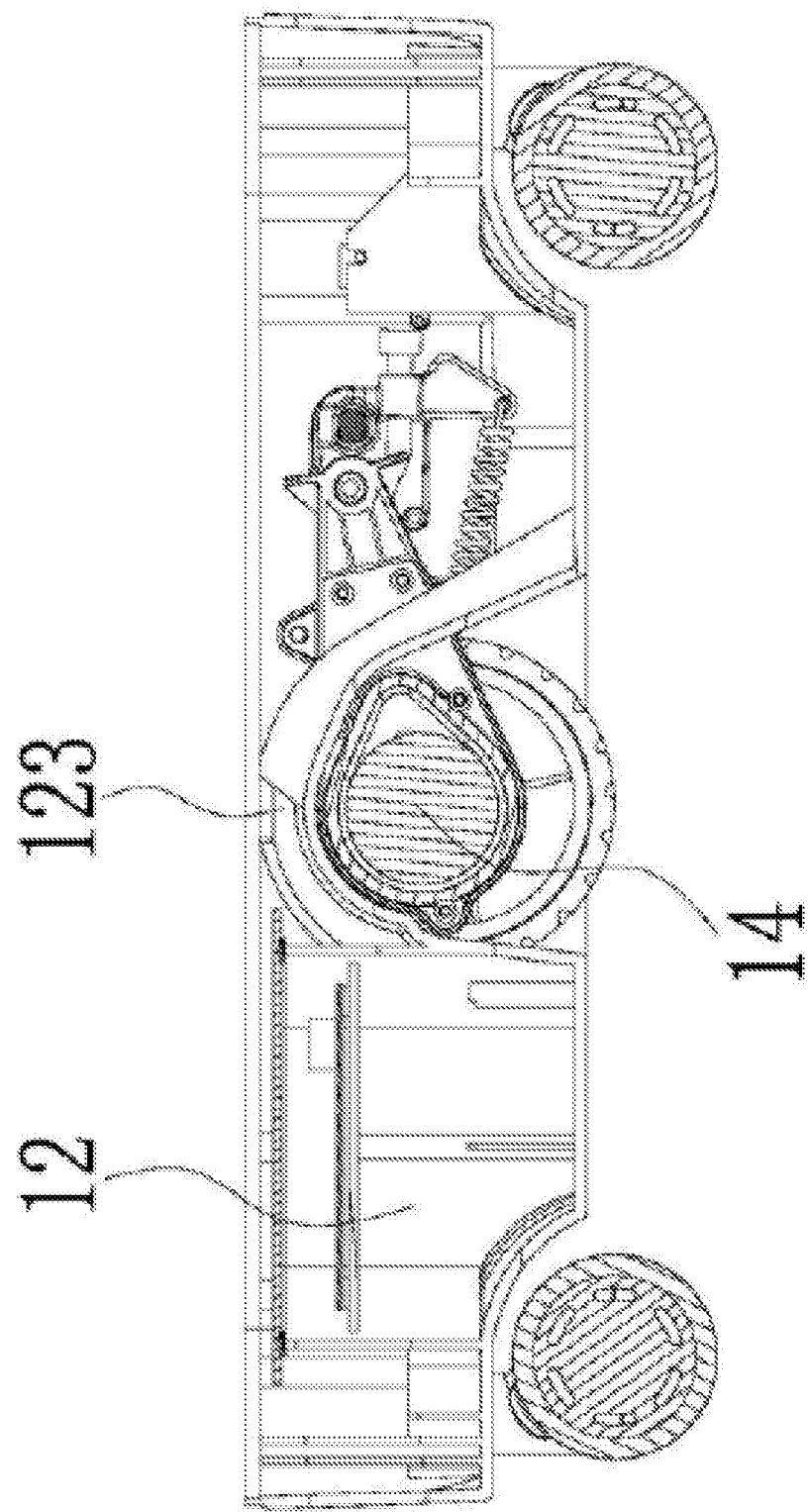
FIG. 12 is a schematic view showing the power wheel retracted into the case body in embodiment 1.

The first swinging piece 31 comprises a main body portion 311 that connects the driving mechanism 4, a rotating shaft connecting portion 312 that is fixed to the main body portion 311 and connected to the rotating shaft 42 of the driving mechanism 4, a hinge portion 313 fixed to the main body portion 311 and hinged to the second swinging piece 32, and a first lug portion 314 projecting downward from the main body portion 311 and connecting the resilient member 4. The rotating shaft 42 is fixedly connected to the rotating shaft connecting portion 312 by screws. The shaft connecting portion 312 and the power wheel 14 are respectively located at both sides of the hinge portion 313. When the rotating shaft 42 of the driving mechanism 4 rotates, the first swinging piece 31 can swing around the rotating shaft 42. When the control system 15 drives the first swinging piece 31 of the swinging device 3 to swing around the rotating shaft 42 by the driving mechanism 4, the hinge portion 313 of the first swinging piece 31 can drive the power wheel 14 mounted on the second swinging piece 32 to follow the first swinging piece 31 to swing around the rotating shaft. 42, and drive the power wheel 14 to ascend and descend with respect to the case body 1. When the power wheel 14 is lowered with respect to the case body 1, the power wheel 14 can protrude out of the intermediate receiving portion 123 of the second body 12 (as shown in FIG. 11), and the power wheel 14 can abut against the ground and support the case body 1 together with the auxiliary wheel 13. The auxiliary wheel 13 is driven by the power wheel 14, and then the smart luggage case is in the electric driving mode, and the smart luggage case is driven by the power wheel 14. When the power wheel 14 rises with respect to the case body 1, the power The wheel 14 can be received in the intermediate receiving portion 123 of the second body 12 (as shown in FIG. 12) and separated from the ground, and the smart luggage is supported on the ground by the auxiliary wheel 13, then the smart luggage is in the manual moving mode, and smart luggage case is pushed or pulled to move by the user. The control system 15 drives the swinging device 3 to adjust the height of the power wheel 14 with respect to the ground by the driving mechanism 4, so that the smart luggage can be conveniently switched between the electric driving mode and the manual moving mode, thereby improving the user experience.

Referring to FIG. 9, the first lug portion 314 protrudes from the lower end of the first swinging piece 31, and the second swinging piece 32 is provided with the second lug portion 321 opposite to the first lug portion 314. The second lug portion 321 is correspondingly protruded from the lower end of the second swinging piece 32. Two ends of the resilient member 33 are connected to the first lug portion 314 and the second lug portion 321 respectively. The resilient member 33 is a tension spring. The tension spring is located below the pivotal joint of the first swinging piece 31 and the second swinging piece 32. The second swinging piece 32 is pulled to swing toward the lower portion of the case body 1 with respect to the first swinging piece 31 by the pulling force of the tension spring. In other embodiments, the resilient member 33 can also be a compression spring. The compression spring is located above the pivotal joint of the first swinging piece 31 and the second swinging piece 32. The second swinging piece 32 is urged to swing, relative to the first swinging piece 31, to the lower portion of the case body 1 by the extension force of the compression spring. Then, the first lug portion 314 protrudes from the upper end of the first swinging piece 31, and the second lug portion 321 protrudes from the upper end of the second swinging piece 32.

When the second swinging piece 32 wings with respect to the first swinging piece 31 by the force of the resilient member 33, the power wheel 14 can be swung with respect to the first swinging piece 31. The power wheel 14 can maintain a state of swinging to the lower portion of the case body 1 by the urging force of the resilient member 33 during the ascending or descending process, and can abut against the ground, then the ground exerts a counterforce to the power wheel 14, and the counterforce can counteract part of the force of the resilient member 33, so that the power wheel 14 mounted on the second swinging piece 32 is still in contact with the ground and a friction with the ground generated to push the smart luggage case to move. When the power wheel 14 is in contact with the ground, the ground can limit the swinging angle of the second swinging piece 32 with respect to the first swinging piece 31. When the power wheel 14 is separated from the ground, the reaction force of the ground to the power wheel 14 is lost. At this time, the force from the resilient member 33 causes the second swinging piece 32 to further swing to the lower portion of the case body 1, and the power wheel 14 follows the second swinging piece 32 to descend toward the lower portion of the case body 1. It should be noted that when the smart luggage moves on the uneven ground, for embodiment, when the power wheel 14 is currently in the groove of the ground, the power wheel 14 loses the reaction force from the ground to the power wheel 14, and at this time, the second swinging piece 32 further swings to the lower portion of the case body 1 by the force of the resilient member 33, resulting the power wheel 14 to descend to the lower portion of the case body 1 and contact the bottom surface of the ground groove. A friction can be generated by the power wheel 14 with a convex surface of the ground and promote the movement of the smart luggage case. On the contrary, when the power wheel 14 is currently in the convex surface of the ground, the reaction force generated by the ground to the power wheel 14 can cause the second swinging piece 32 to swing, relative to the first swinging piece 31, toward the upper portion of the case body 1, that is to lift the power wheel 14, and the power wheel 14 can still generate friction with the convex surface of the ground and push the smart luggage to move. The power wheel 14 can adjust the swinging angle of the second swinging piece 32 with respect to the first swinging piece 31 upward or downward to coordinate the power wheel 14 to keep contact with the ground according to the change of the reaction force of the ground with respect to the power wheel 14 in time, thereby improving the stability of the operation of the smart luggage case. The opening formed in the wall of the intermediate receiving portion 123 can provide an active space for a maximum swing amplitude when the second swinging piece 32 is swung up and down with respect to the first swinging piece 31.

The first swinging piece 31 is provided with a limitation member 315 for restricting the second swinging piece 32 from swinging, in relative to the first swinging piece 31, toward the lower portion of the case body 1. The limitation member 315 is located below the pivotal joint of the first swinging piece 31 and the second swinging piece 32 and is located above the tension spring. The limitation member 315 is a pin shaft, and the pin shaft is fixedly connected to the first swinging piece 31. When the second swinging piece 32 swings, in relative to the first swinging piece 31, toward lower portion of the case body land abuts against the limitation member 315, the limitation member 315 can restrict the second swinging piece 32 from swinging with respect to the first swinging piece 31 toward the lower portion of the case body 1. The limitation member 315 can prevent the second swinging piece 32 from swinging without limit with respect to the first swinging piece 31 under the tensile force of the tension spring. By limiting the swinging angle of the second swinging piece 32 with respect to the first swinging piece 31, the second swinging piece 32 can be avoided from touching the opening in the wall of the intermediate receiving portion 123 and further breaking the second body 12, and the swinging angle of the power wheel 14 with respect to the first swinging piece 31 can be controlled to keep contact with the ground. The limitation member 315 can also be used to cause the power wheel 14 mounted on the second swinging piece 32 to be retracted into the intermediate receiving portion 123 of the second body 12 when the control system 15 drives the swinging device 3 through the driving mechanism 4 to drive the power wheel 14 to be lifted. at this time, the reaction force of the ground to the power wheel 14 is reduced due to the rise of the power wheel 14, and the second swinging piece 32 drives the power wheel 14 to swing to the lower portion of the case body 1 with respect to the first swinging piece 31 by the urging force of the resilient member 33 and the second swinging piece 32 gradually approaches the limitation member 315. When the second swinging piece 32 abuts against the limitation member 315, the limitation member 315 limits the swinging angle of the second swinging piece 32 with respect to the first swinging piece 31, and the control system 15 continues to drive the swinging device 3 through the driving mechanism 4 and causes the power wheel 14 to be lifted, so that the power wheel 14 can be quickly retracted into the intermediate receiving portion 123 of the second body 12.

In this embodiment, the swinging device 3 is provided with a fine adjustment member for restricting the relative swinging angle when the second swinging piece 31 is swinging to the lower portion of the case body 1 with respect to the first swinging piece 32. the fine adjustment member comprises a bolt 34 threadedly connected to the first swinging piece 31 and configured to abut the second swinging piece 32. The second swinging piece 32 is provided with a resistant block 322 located below the pivotal joint to allow the bolt 34 to abut thereto. The first swinging piece 31 is located below the rotating shaft connecting portion 312 and is provided with a screw hole 316 fitted to the bolt 34. The resistant block 322 is located below the pivotal joint. The user can adjust the swinging angle of the second swinging piece 32 with respect to the first swinging piece 31 by manually screwing the screw depth of the bolt 34 with respect to the screw hole 316. The fine adjustment member can cooperate with the limitation member 315 mounted on the first swinging piece 31 to collectively limit the swinging angle of the second swinging piece 32 toward the lower portion of the case body 1 with respect to the first swinging piece 31. The user can further increase the screw depth of the bolt 34 with respect to the screw hole 316 to reduce the swinging angle of the second swinging piece 32 toward the lower portion of the case body 1 with respect to the first swinging piece 31. In addition, when the smart assisting luggage cases are installed with two power wheels 14, in order to eliminate the problem that the axial lines of the two power wheels 14 are not on the same axis due to the installation process, the user can manually adjust the one or two of the fine adjustment members on the swinging devices 3 such that the axial lines of the two power wheels 14 are located on the same axis, which makes the structure simple and the adjustment speed fast.

In this embodiment, a first limitation switch 35 and a second limitation switch 36 both signally connected to the electric motor of the driving mechanism 4 are respectively disposed on two sides of the first lug portion 314 of the first swinging piece 31. When the control system 15 drives the swinging device 3 by the driving mechanism 4 and drives the power wheel 14 to ascend or descend, the first lug portion 314 follows the first swinging piece 31 to rotate about the rotating shaft 42 of the driving mechanism 4. When the first lug portion 314 touches is touched with the first limitation switch 35 or the second limitation switch 36, the first limitation switch 35 or the second limitation switch 36 sends a signal to the electric motor 41 of the driving mechanism 4, and controls the electric motor 41 of the driving mechanism 4 to stop rotating and the electric motor 41 is prevented from being damaged, and the service life of the driving mechanism 4 is improved. In other embodiments, the first limitation switch 35 and the second limitation switch 36 may also be disposed on both sides of the main body portion 311 of the first swinging piece 31. In addition, the first limitation switch 35 and the second limitation switch 36 can be signally connected to the control system 15 and control the electric motor 41 of the driving mechanism 4 to stop rotating by the control system 15.

Figure 3:
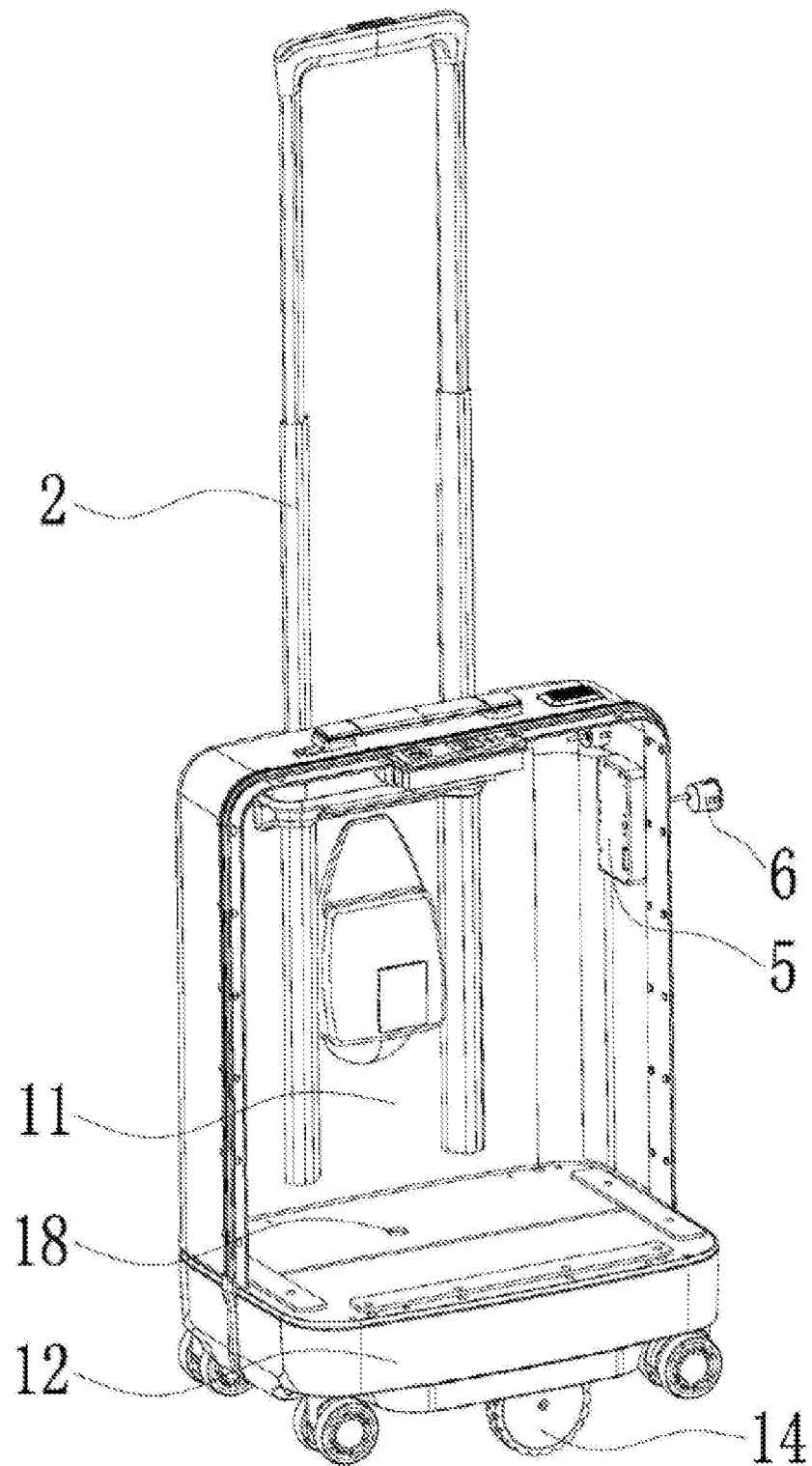
FIG. 3 is an internal perspective view of a first body of the smart luggage case of the first embodiment.
Figure 4:
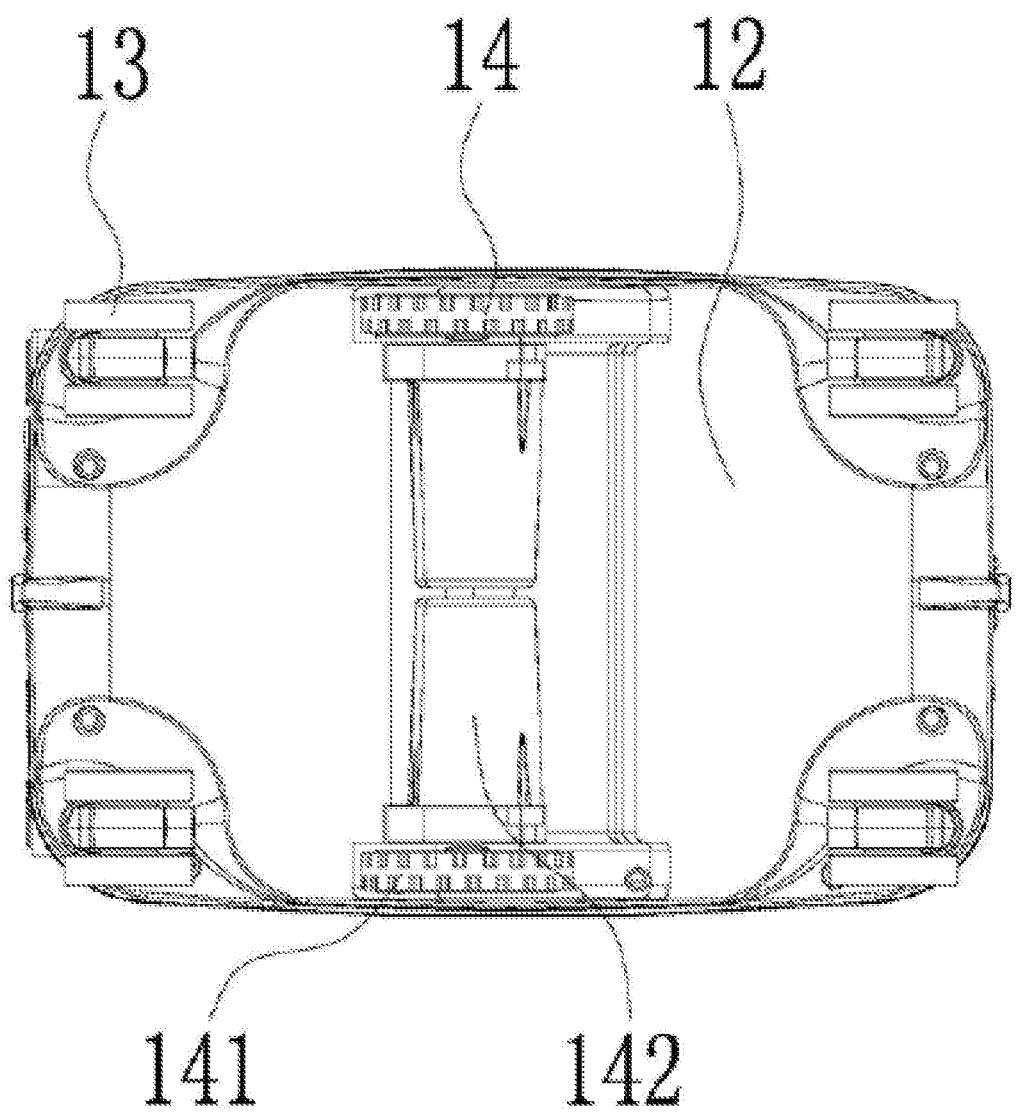
FIG. 4 is a bottom view of the smart luggage case of the embodiment 1.

Referring to FIG. 1 and FIG. 3, in this embodiment, the first body 11 of the case body 1 is further provided with an camera following module 5 and an ultra-wideband wireless communication following module. The camera following module 5 and the ultra-wideband wireless communication following module are connected by wire to the control system 15 mounted on the second body 12. Compared with the wireless connection, the wired connection is not affected by the strength of the wireless communication signal, ensuring the reliability of signal transmission and increasing the speed of information transmission.

The camera following module 5 is mounted on the inner wall of the front end of the first body 11 (as shown in FIG. 3). The camera following module 5 comprises a camera and an image processing module. The camera is connected to the image processing module and transmits image information of the object acquired in real time to the image processing module. The image processing module is connected to the control system 15 via a camera following module 5. The control system 15 controls the rotation of the two power wheels 14 according to an image recognition information from the image processing module, and the four auxiliary wheels 13 are driven to rotate by the two power wheels 14. When the smart luggage case runs on the road, it can follow the user's movement through the visual following control mode, and the user's hands are liberated; and the smart luggage case can be turned when the two power wheels 14 are rotated at a differential speed.

It should be noted that the target object may be a user who uses a smart luggage case, or may be another mobile device. The other mobile device may be another smart luggage case, which enables many smart luggage cases to follow the user movement in a queue.

In this embodiment, the battery provides operating power to the camera following module 5. When the camera following module 5 is assembled on the first body 11 of the case body 1, the camera is located in the inner side of the case body 1. The front side wall of the case body 1 is provided with a through hole for imaging of the camera. The position of the through hole corresponds to the position of the camera, and the camera located in the inner side of the case body 1 can take photograph through the through hole. The camera can also be embedded in the through hole and take photograph through the through hole. The side wall of the case body 1 is installed with a transparent base layer of the camera, and the camera can shoot through the transparent base layer. The transparent base layer can also prevent dust from covering the lens surface of the camera. The transparent base layer is made of glass, acrylic or resin optical material. The camera following module 5 can also be an intelligent electronic device, such as a cell phone, a tablet computer or a digital camera, which reduces the production cost of the smart luggage case and is convenient for the public. A fixing member for fixing the camera following module 5 is mounted on the case body 1. The camera is connected to the image processing module. The camera is used to capture image information of the user's movement and feed back to the image processing module, which facilitates the movement and steering of the smart luggage case according to the user. The camera and image processing module of the smart luggage case are integrated in the camera following module 5. When assembling the camera and image processing module of the smart luggage case, the worker only needs to assemble the camera following module 5 on the case body 1 to complete the assembly of the camera, therefore the assembly speed is fast, which is convenient for improving the installation convenience. And the signal lines of the camera and the image processing module are also integrated in the camera following module 5, so that phenomenon of bumping the signal line connector can be avoided when luggage is used for storing items.

The image processing module comprises a first recognition function module for identifying shape information of the followed target, and a second recognition function module for identifying color information within the shape of the followed target. The first recognition function module identifies the shape information of the object according to the image information captured by the camera; the second recognition function module identifies the color information within the shape. The first identification function module and the second identification function module are distinguished by functions, not by physical entities. In other words, the first identification function module and the second identification function module may be the same physical entity or two different physical entities.

Before the smart luggage starts to follow the target, the camera collects image information of the target and sends it to the image processing module. The first recognition function module identifies the shape information of the target according to the image information captured by the camera and the shape information is regarded as a shape reference information; the second recognition function module identifies the color information in the shape and the color information is regarded as the color reference information. When the smart luggage moves, the camera collects shape information and color information of the target in real time, and sends the shape information collected in real time as shape comparison information to the image processing module, and simultaneously sends the color information collected in real time as color comparison information to the image processing module. The first recognition function module compares the shape comparison information with the shape reference information, and the second recognition function module compares the color comparison information with the color reference information. When the shape information and the color information are consistent, the control module controls the two power wheels 14 to rotate and follow the target. In the embodiment, the image processing module only recognizes the shape information and the color information in the shape, and does not recognize the background information acquired by the camera in real time or the information of the color varied with the light in the shape, so the time for the recognition operation can be reduced which is conducive to improve the follow-up sensitivity of the smart luggage case.

The ultra-wideband wireless communication following module is mounted on the outer wall of the front end of the first body 11. The ultra-wideband wireless communication following module comprises a receiver 6 and a microprocessor. The user wears a signal tag, such as an electronic wristband. The signal tag transmits a signal, and the receiver 6 receives the signal transmitted by the signal tag. The receiver 6 is mounted on the front side wall of the first body 11 (shown in FIG. 3) and transmits the received signal to the microprocessor. The microprocessor calculates and processes the signal and transmits it to the control system. The control system controls the rotation of the two power wheels 14 according to the signal processing information, and the four auxiliary wheels 13 are driven to rotate by the two power wheels 14, so that when the smart luggage case runs on the road, it can follow the user's movement through a ultra-wideband wireless signal following operation mode, which liberates the user's hands, and when the two power wheels 14 rotate at a differential speed, the smart luggage can be turned.

It should be noted that the ultra-wideband wireless signal following operation mode can assist the above-mentioned visual following operation mode to realize the motion tracking control of the smart luggage case. In the following process of the smart luggage, two following means compensate for each other, avoiding the loss of the following signal of the smart luggage case, and further improving the operational stability of the smart luggage when it is automatically following the target. The above-mentioned visual following and wireless signal following can also be used independently.

The battery mounted on the first body 11 supplies operating power to the microprocessor and receiver 6. Specifically, the current from the battery via a POE interface is converted to 3.3V DC through a DC regulator to power the microprocessor and other devices. The microprocessor is a 32-bit ARM microcontroller from the CortexM3 core chip STM32F series. The SPI interface between the receiver 6 and the microprocessor is used for ultra-wideband wireless signal data communication. In this embodiment, a storage module is further provided, and the storage module is connected to the microprocessor through an SPI interface for data storage and processing of the system.

UWB technology is a wireless technology with high transmission rate (up to 1000 Mbps), low transmission power, and strong penetration capability, and the wireless technology is based on an extremely narrow pulse: no carrier wave. It is these advantages that make it more accurate in indoor positioning field. the TDOA ranging positioning algorithm commonly used in UWB positioning algorithm, that is the arrival time difference algorithm, is less affected by external factors, has low positioning error, is insensitive to channel fading, has low probability of interception capability and less system complexity and It can provide centimeter-level positioning accuracy and other advantages, and the positioning accuracy reaches 1 centimeter during testing. The receiver 6 receives the signal from the signal tag through an antenna, processes the arrival time of the different signals, generates a time difference data packet, and transmits the data packet to the microprocessor, and the microprocessor calculates the position information according to the data in the data packet then the microprocessor can calculate the actual distance between the smart luggage and the user based on the location information. The storage module stores a distance setting threshold between the smart luggage and the user. The microprocessor compares the actual distance value with the distance setting threshold. When the actual distance value is greater than the distance setting threshold, the microprocessor controls the two power wheels 14 to accelerate to reach the distance setting threshold; when the actual distance value is less than the distance setting threshold, the microprocessor controls the two power wheels 14 to decelerate to reach the distance setting threshold.

Embodiment 2

Referring to FIGS. 13 to 16, the present embodiment is different from the embodiment 1 in the connection structure between the electric motor 41 of the driving mechanism 4 and the rotating shaft 42.

Figure 13:
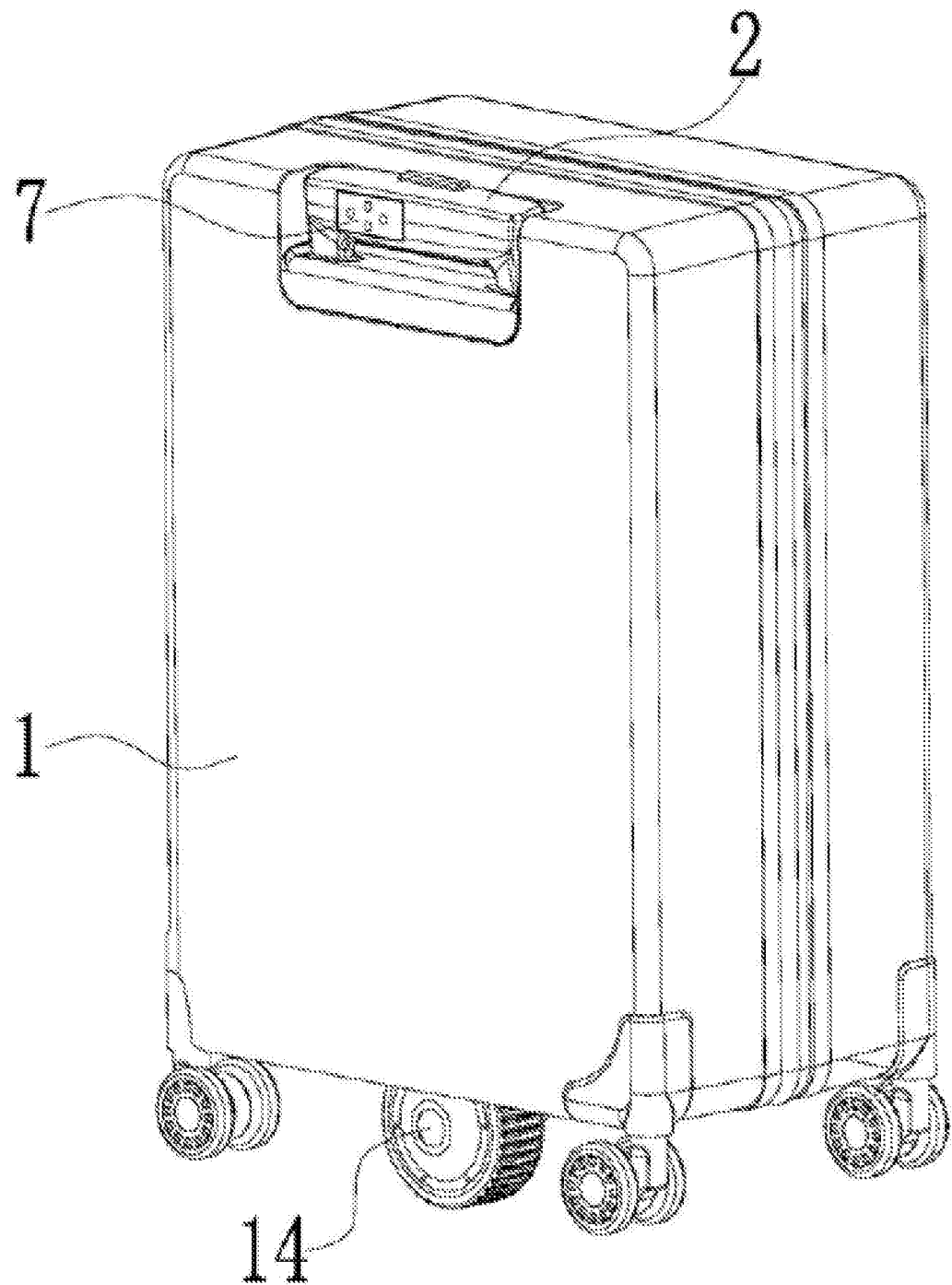
FIG. 13 is a perspective view of a smart luggage case according to embodiment 2 of the present application.
Figure 14:
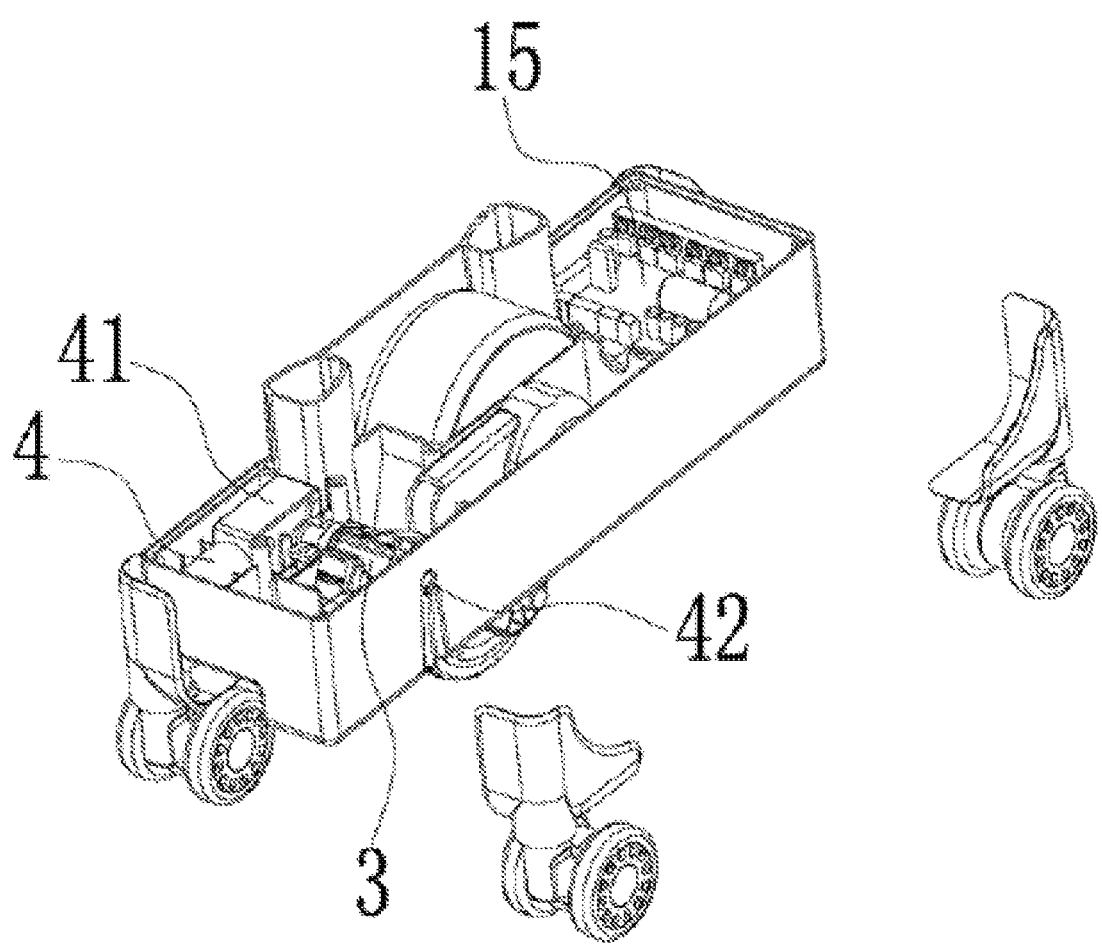
FIG. 14 is a perspective view of FIG. 13 after removing the case and the tension bar.
Figure 15:
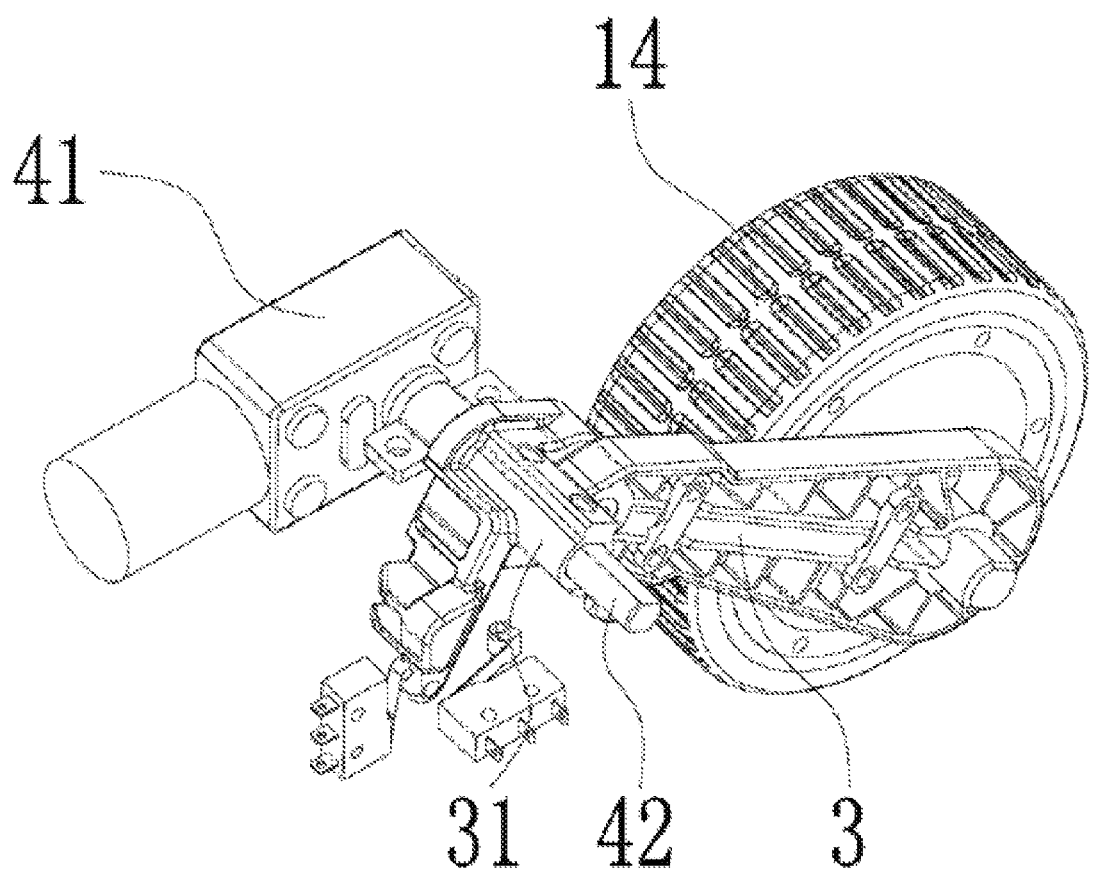
FIG. 15 is a perspective view showing the driving mechanism of embodiment 2 connected to the power wheel.
Figure 16:
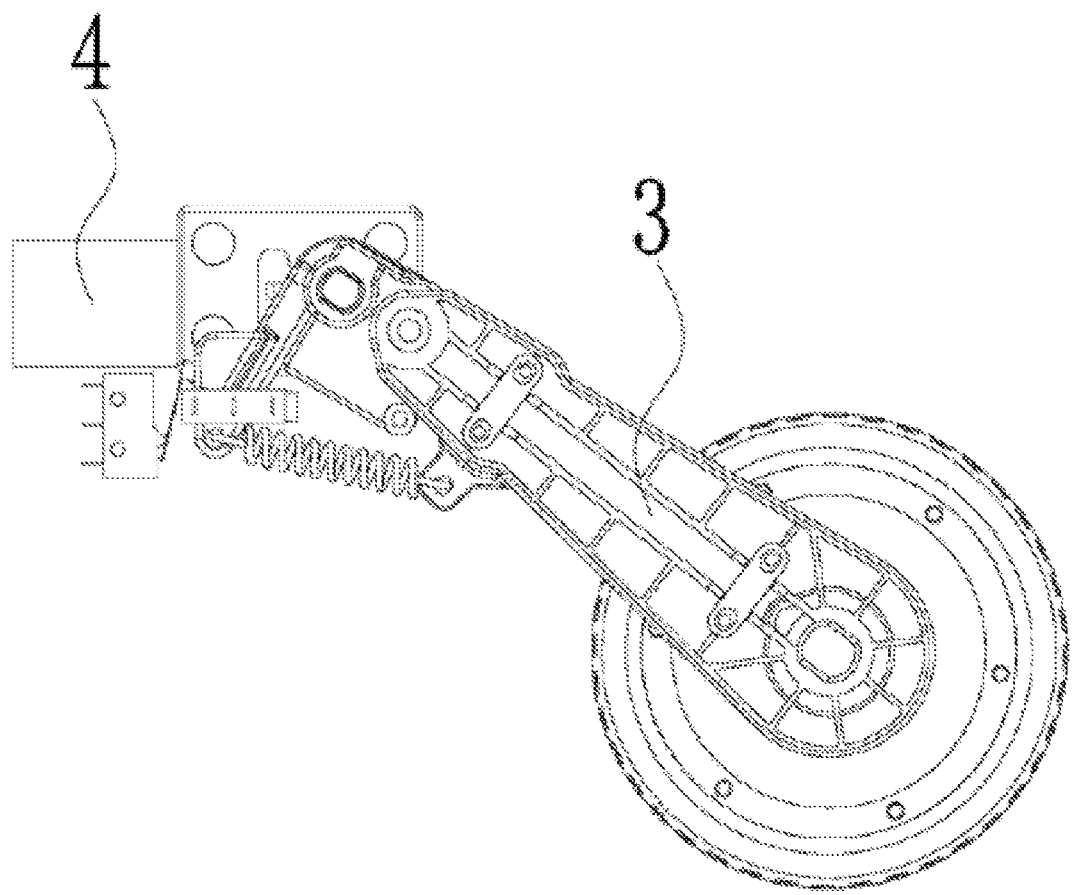
FIG. 16 is a front view showing the driving mechanism connected to the power wheel in embodiment 2.

In this embodiment, the driving mechanism 4, the swinging device 3 and the control system 15 are mounted in a receiving box (as shown in FIG. 13, wherein the cover of the receiving box is not shown). The electric motor 41 is a gear motor. The geared motor is an integrated body of a gear unit and the electric motor which is conducive to save the space of the case body. The electric motor output shaft of the electric motor 41 is axially connected to the rotating shaft 42 through a coupling. The smart luggage case is provided with a power wheel 14, which corresponds to the one side of the tension bar 2. One end of the rotating shaft 42 is fixedly connected to the swinging device 3, and extends through the first swinging piece 31 of the swinging device 3 toward the side wall of the case body, and is rotatably connected to the side wall of the case body 1. The other end of the rotating shaft 42 is fixedly connected to the electric motor output shaft through a coupling. When the smart assisting luggage cases are installed with two power wheels 14, the electric motor 41 can be a gear motor that has a bidirectional output shaft. The two motor output shafts are respectively connected to the two swinging devices through the two ends of the rotating shaft 42.

In this embodiment, the tension bar 2 is provided with a wireless controller that is connected to the control system and is used to control the power wheel 14. In the prior art, the signal lines of the controller mounted on the tension bar are introduced into the control system of the case through the hollow portion of the tension bar. When the user uses the tension bar, the tension bar moves to the left and right sides of the case body, and the signal line is easy to be broken and its welding head is easy to fall off which causes the signal disappear. Compared with the wired communication of the signal line in the tension bar, the wireless communication is convenient to be equipped, and can keep the signal fluent and stable in operation.

The wireless controller comprises a button area 7, a touch sensing module connected to the button area 7, a signal processing module connected to the touch sensing module, and a wireless communication module connected to the signal processing module. The wireless communication module signal is connected to the control system 15 installed in the case body 1.

The button area 7 comprises manipulations buttons for such as forward, backward, acceleration, and deceleration. The button area 7 is a flexible button. In other embodiments, the button area 7 can also be a liquid crystal touch screen.

The user holds the tension bar and presses the corresponding control buttons by fingers. The touch sensing module receives the pressing information and transmits it to the signal processing module. The signal processing module calculates the pressing information and forms an electrical signal and sends it to the wireless communication module. The wireless communication module transmits the electrical signal to the control system 15 in accordance with the communication protocol, and the control system controls the movement of the smart luggage based on the electrical signal. It should be noted that when the user's finger leaves the button area 7, the control system instantly controls the smart luggage case to stop moving, and prevents the smart luggage case from moving by itself and accidentally touching other objects. The wireless controller has a simple structure and is convenient to be operated.

In this embodiment, the wireless communication module is an ultra-wideband wireless communication module, a Bluetooth wireless communication module, an ultrasonic wireless communication module, or an infrared wireless communication module.

Ultra-wideband wireless communication technology adopts the arrival time difference algorithm, which is less affected by external factors, has wide bandwidth, high-speed data transmission, low transmission power consumption, and high security performance, etc., and can realize an ultra-wideband and high-speed data transfer in short distance.

Bluetooth wireless communication is a short-range wireless communication technology that realizes signal transmission without the aid of the Internet.

Ultrasonic wireless communication uses ultrasonic wave for signal transmission. Ultrasonic wave is a mechanical wave with a vibration frequency higher than that of sound waves. It is generated by the vibration of the transducer wafer under the excitation of voltage. It has the following features: high frequency, short wavelength and less diffraction phenomenon. especially good directionality, ability to be transmitted as a ray in one direction. Ultrasonic wave is good at penetrating liquids and solids, especially in sunlight opaque solids, the ultrasonic wave can penetrate depths of tens of meters. When an ultrasonic wave hits an impurity or an interface, it will produce a significant reflection to form a reflection echo, which can produce a Doppler effect when it hits a moving object.

Infrared wireless communication uses infrared wave for signal transmission. The infrared ray is also called infrared light, which has the properties of reflection, refraction, scattering, interference, absorption and the like. Any substance, as long as it has a certain temperature (above absolute zero), can radiate infrared rays. Infrared has the advantages of high sensitivity and fast response.

Finally, it should be noted that the above embodiments are only for explaining the present application and are not intended to limit the technical solutions described in the present application. Therefore, although the present specification has been described in detail with reference to the embodiments described above, it is to be understood by those skilled in the art that the present invention may be modified or equivalently substituted without departing from the spirit and scope of the present application.

The specific embodiments of the present application are described in detail below with reference to the drawings, and are not intended to limit the scope of the application.

Figure 17:
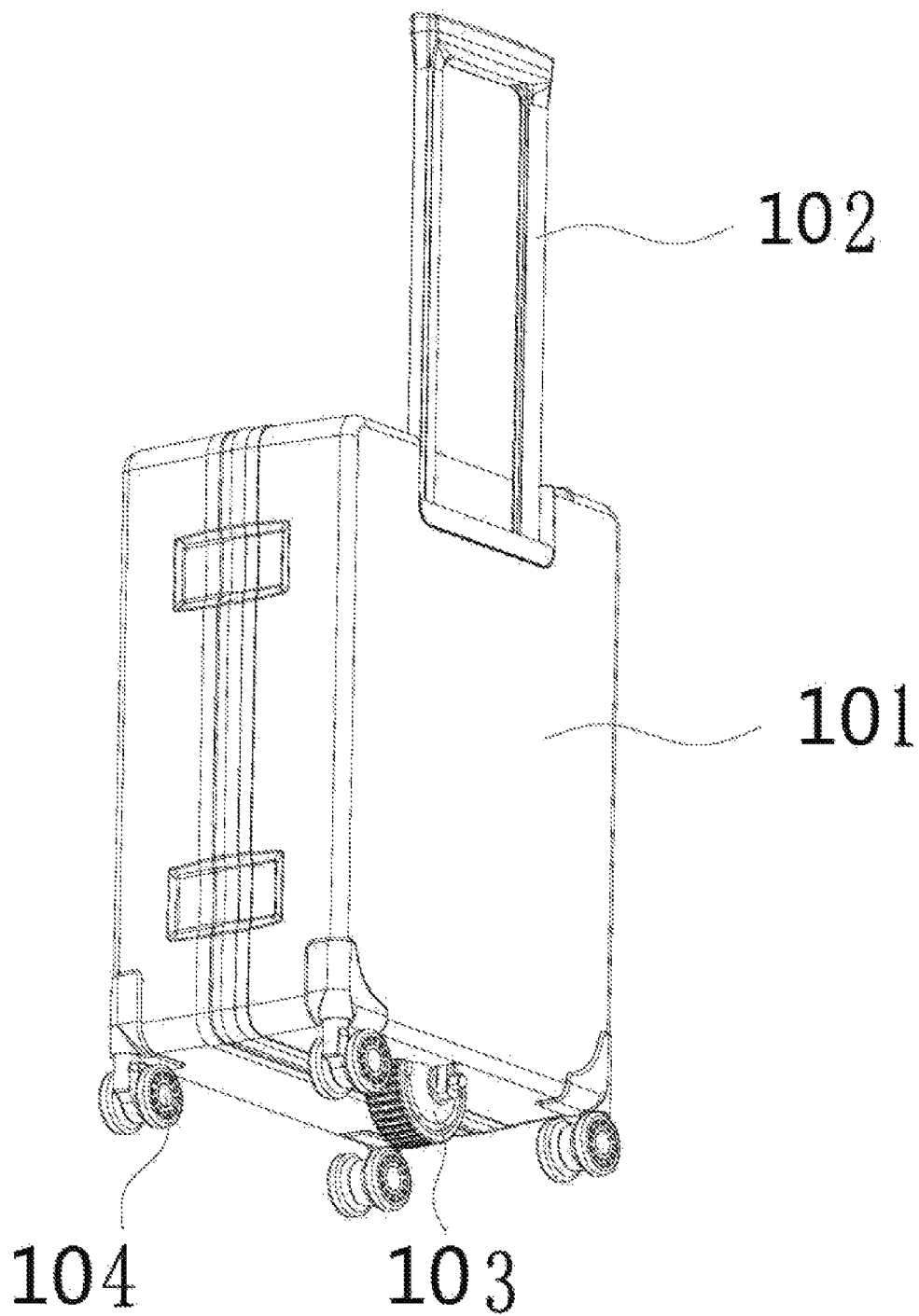
FIG. 17 is a perspective view of the assisting luggage case of the present application.

Referring to FIG. 17, the embodiment provides an assisting luggage case, comprising a case body 101, a tension bar 102 mounted on the case body 101 for pulling or pushing the luggage case, a power wheel 103 mounted on the bottom of the case body, and a universal wheel 104, a control system and a battery mounted on the case body, and a sensor for detecting the operation state of the assisting luggage case. The power wheel 103 is a hub motor wheel or a wheel driven by a gear motor. The universal wheel 104 is driven by the power wheel 103. The battery is electrically connected to the power wheel, control system and sensor and provides operating power. A power switch is mounted on the case body to turn the power circuit on or off. The battery is a rechargeable battery or a dry battery. The assisting luggage can be provided with a spare battery. The battery is detachably mounted in the case body, which is convenient for replacing a spare battery. It can be disassembled at any time during aviation security inspection for passing the security check and for charging when the battery separated from the case body. The sensor is signally connected to the control system. The sensor is used to detect the operation parameters of the power wheel in the operating state and feedback the operation parameters to the control system. The operation parameters comprise one of the following parameters: a rotation speed of the power wheel of the assisting luggage case, an acceleration speed during the operation, and power, current, and voltage of the electric motor. The control system can drive the power wheel to rotate according to the variation of any one of the parameters to realize the movement of the assisting luggage case. In other embodiments, the control system can also drive the power wheel to rotate after analyzing and processing the varying amount of several operation parameters.

The assisting luggage has two movement modes comprising a non-assisting movement mode and an assisting operation mode. Turning on the power switch will switch the luggage to the assisting operation mode. Turning off the power switch will switch the luggage to the non-assisting movement mode.

Referring to FIG. 17, in the present embodiment, four universal wheels 104 and one power wheel 103 are mounted at the bottom of the case body. The four universal wheels 104 are respectively mounted at four corners on the lower portion of the case body 101, and the power wheels 103 are located between the four universal wheels 104. The four universal wheels 104 are driven by the power wheel 103. There can be two power wheels 103, and the two power wheels are arranged laterally or vertically.

When the assisting luggage cases perpendicular to the road surface, the power wheel 103 and the four universal wheels 104 are in contact with the road surface, and the user pushes the assisting luggage case through the tension bar. At this time, the power switch of the assisting luggage case can be turned on and the assisting luggage can be moved in the assisting operation mode, the control system drives the power wheel to rotate, a friction is generated by the power wheel and the road surface and the luggage is driven to move, and the universal wheel can follow the rotation of the power wheel. The power switch can be turned off and the assisting luggage case can be moved in a non-assisting moving mode, and the movement of the luggage case can be driven by the pushing force on the tension bar from the user. It should be noted that the non-assisting movement mode can be used when the original and spare power are exhausted.

In the non-assisting movement mode, the assisting luggage can not only be perpendicular to the road surface, but also be inclined to the road surface. When the assisting luggage is inclined on the road surface, the two universal wheels installed at one side of the case contact the road surface and generate friction, and the power wheel and the two universal wheels at the other side of the case are separated from the road surface. The user pulls the assisting luggage through the tension bar, and the luggage can be moved by the pulling force exerted by the user on the tension bar.

In the embodiment, when the assisting luggage is moved in the assisting operation mode on an uneven road, the power wheel among the four universal wheels is easily suspended in air and separated from the road surface, so that the frictional force cannot be generated. The power wheel is connected to the case body through an elastic telescopic mechanism (not shown), and the extension and compression of the elastic telescopic mechanism enable the power wheel to abut against the road surface in any road environment, thereby ensuring the operation of the assisting luggage in the assisting operation mode.

Figure 18:
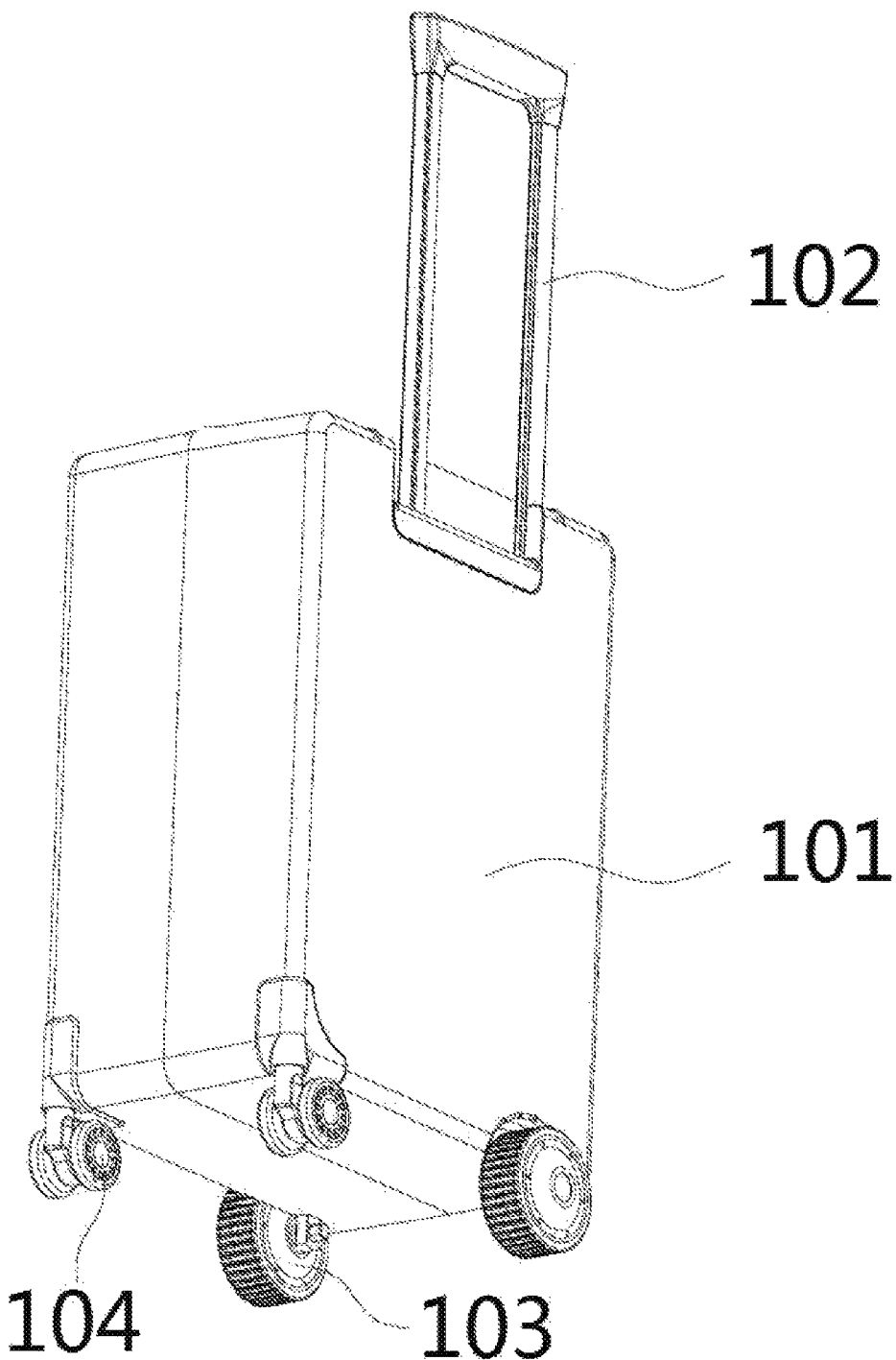
FIG. 18 is a schematic view showing the installation of a power wheel and a universal wheel of the power assisting luggage case according to another embodiment of the present application.

The present application also provides another embodiment of a power wheel and a universal wheel mounted on the case body. Referring to FIG. 18, two power wheels 103 and two universal wheels 104 are mounted at the bottom of the case body 101. The two power wheels 103 and the two universal wheels 104 are respectively mounted on opposite sides of the bottom of the case. The two power wheels 103 are capable of contacting the road surface when the assisting luggage case is perpendicular to the road surface or inclined to the road surface. The assisting luggage is in the assisting operation mode when the power switch is turned on; the assisting luggage is in the non-assisting movement mode when the power switch is turned off.

In the above embodiment, the user can realize the steering of the luggage in the assisting operation mode and the non-assisting movement mode by the change of the body posture. When the user pushes or pulls the assisting luggage through the tension bar, the steering of the assisting luggage case is realized by the arm twisting the tension bar. In the actual use of the luggage case, the user can also use the tension bar to directly apply force to the case through the palm of the hand. The method of twisting the luggage case by the palm can also realize the steering of the luggage case. In addition, it should be noted that when the assisting luggage case perpendicular to the road surface is in the assisting operation mode, the user can also ride on the case body and realize the steering of the assisting luggage case by twisting the case body via the waist.

Figure 19:
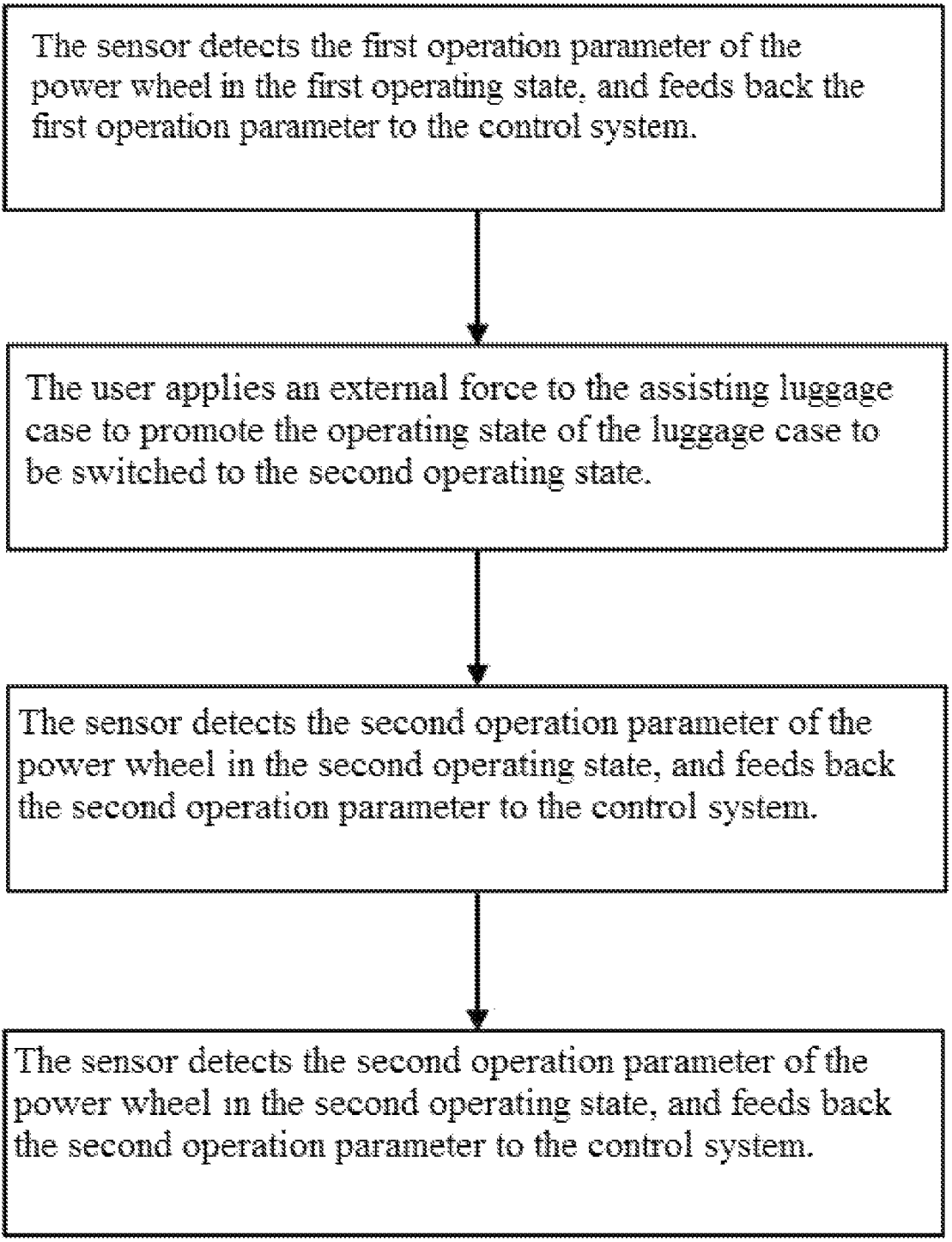
FIG. 19 is a flow chart of a method for controlling the operation of the assisting luggage case of the present application.

Referring to FIG. 19, the present application provides a method for controlling the operation of the luggage case in the assisting operation mode, comprising the following steps:

Step S1: The sensor detects the first operation parameter of the power wheel in the first operating state, and feeds back the first operation parameter to the control system.

In this embodiment, the user turns on the power switch of the assisting luggage case, at this time, the user does not apply an external force to the assisting luggage case, and the assisting luggage case is in the first operating state, and the first operating state is the initial stationary state. After the assisting luggage case is operated, the first operating state can also be a moving state during operation.

In this embodiment, the sensor is a Hall sensor. The Hall sensor is a magnetic field sensor fabricated based on the Hall effect. The Hall sensor is mounted on the stator inside the wheel of the hub motor. It should be noted that the hub motor in this embodiment is a brushless hub motor, and the brushless hub motor itself has a Hall sensor built therein, and the Hall sensor is mounted on the stator. The Hall sensor in the brushless hub motor in prior art is used to determines the relative position of the rotor to the stator to facilitate commutation. The operation control method utilizes the working principle of the Hall sensor, and can be used to detect various operation parameters of the power wheel in the first operating state, for embodiment: the speed of the power wheel, the acceleration speed during rotation, the power, current, and voltage of the electric motor in rotation. In this embodiment, the current detected by the Hall sensor is taken as an operation parameter. The first operation parameter of the power wheel of the assisting luggage case in the initial stationary state or the moving state during the operating state is detected by the Hall sensor as the first operation parameter. The Hall sensor feeds back the first operation parameter to the control system.

In other embodiments, the sensor may also be a photoelectric sensor or a displacement sensor.

Step S2: The user applies an external force to the assisting luggage case to promote the operating state of the luggage case to be switched to the second operating state.

In this embodiment, when the assisting luggage moves on the road surface, the frictional force of the road surface with respect to the assisting luggage case is generated. The user applies force to the tension bar or the case body through the hand, and the force overcomes the friction force to cause the assisting luggage to be moved forward from the initial stationary state, and the force can further increase the moving speed of the assisting luggage, reduce the moving speed, and stop moving, move backwards. The force may be a positive assisting force in the forward direction or a reverse assisting force in the backward direction. When the force is positively assisted, the assisting luggage is moved forward from the initial stationary state or the moving speed of the assisting luggage is increased; when the force is reverse assisted, the moving speed of the assisting luggage is decreased, the assisting luggage is moved backward or stopped. The positive assisted and reverse assisted force are mainly generated by the user through hand manipulation according to the actual operating conditions. After the external force is applied to the assisting luggage case, the operating state is switched to the second operation state.

When the user straddles the case body, the legs are supported on the road surface, and the used is supported by the feet pushing backward or forward against the ground, and the road surface correspondingly generates a reaction force acting on the luggage in the forward or backward direction. The two feet pushing backwards to the ground forms a positive forward assisted force, causing the assisting luggage to be moved forward from the initial stationary state or an increase in the speed of movement of the assisting luggage case. The feet pushing forwards to the ground forms a reverse backward assisted force, which causes the luggage case to be decelerated, moved backwards or stopped from moving. After the assisting luggage is applied with external force through the two feet pushing against the ground, its operating state is changed to the second operating state. The force exerted by the foot is similar to the force applied by the user's hand to the tension bar or the case body. There are pedals on the case body, and the feet can be stepped on the pedals when they do not need to be pushed against the ground, which increases the fun and experience of riding the luggage case.

In other embodiments, the force applied to the assisting luggage can also be generated by external factors, such as: the free sliding of the assisting luggage on the slope due to gravity, or the touch to the assisting luggage by other things. The user can also use a stick to indirectly apply force to the luggage case.

It should be explained that the technical feature names "first operating state" and "second operating state" do not refer to two specific operating status of the assisting luggage, but generally refer to the two operating states before and after an external forces are applied to the assisting luggage case from the beginning to the end during the entire operation process. Each "second operating state" is formed by applying an external force to the assisting luggage case on the basis of the "first operating state", that is, between the "first operating state" and the "second operating state", external force is applied to the assisting luggage case to form a relative relationship. It can be understood that during the entire operation from the beginning to the end of the assisting luggage, as long as the external force is continuously applied multiple times, a plurality of corresponding "first operating states" and "second operating states" are generated. Each time interval in which the external force is applied multiple times may be determined according to the actual operation of the assisting luggage, and the unit of time interval may be milliseconds or seconds.

During the entire operation of the assisting luggage case, after each external force is applied on the basis of each current "second operating state", the assisting luggage case will be changed to a new "second operating state", the present "second operating state" is correspondingly converted to the new "first operating state" with respect to the new "second operating state". In addition, the "first operating state" is in a "second operating state" with respect to the assisting luggage that changes after the first application of an external force for the first time, and then the "first operating state" is in an initial stationary state. The "first operating state" can also be in a moving state during operation.

The "second operating state" exists not only in the process of the assisting luggage case moving forward, but also in the process of the assisting luggage case slowing down or retreating, and the "second operating state" may also be a stop state when the assisting luggage cases is finished running.

Step S3: The sensor detects the second operation parameter of the power wheel in the second operating state, and feeds back the second operation parameter to the control system.

In this embodiment, the assisting luggage case changes to the second operating state after an external force is applied. The second operation parameter of the power wheel of the assisting luggage case in the second operating state is detected by the Hall sensor as a second operation parameter. The Hall sensor feeds back the second operation parameter to the control system.

During the entire operation of the assisting luggage from the beginning to the end, the Hall sensor continuously detects a plurality of second operating states after applying an external force and forms a plurality of corresponding second operation parameters. The control system continuously receives a plurality of second operation parameters and performs corresponding analysis and processing.

Step S4: The control system compares the second operation parameter with the first operation parameter, and controls the assisting luggage operation according to a comparison value.

In this embodiment, the first current value before the external force is applied and the corresponding second current value after the external force is applied during the entire operation from the start to the end of the assisting luggage are fed back to the control system, and the control system compares and analyzes the first current value with the second current value.

Let the first current value be $I_1$ and the second current value be $I_2$.

Wherein, if $I_2>I_1$, the rotation speed of the power wheel in the second operating state is greater than that in the first operating state, and the external force enables the assisting luggage case moves with increasing speed; the control system increases the rotation speed of the power wheel to the rotation speed of the power wheel corresponding to $I_2$ according to a comparison value of $I_1$ with $I_2$; if the $I_2>I_1$ is detected after applying the external force again, the assisting luggage case will be accelerated. If $I_2<I_1$ is detected after applying the external force again, the assisting luggage will be decelerated.

If $I_2<I_1$, the rotational speed of the power wheel in the second operating state is less than that of the power wheel in the first operating state, the external force causes the assisting luggage to be decelerated; the control system reduces the rotational speed of the power wheel to the rotation speed of the power wheel corresponding to $I_2$ according to a comparison value of $I_1$ with $I_2$. If $I_2<I_1$ is detected after applying the external force again, the assisting luggage case will be further decelerated. If $I_2>I_1$ is detected after applying an external force, the luggage case will be accelerated.

It should be noted that, if the user does not apply an external force to the assisting luggage case when the assisting luggage moves at a constant speed, the assisting luggage case maintains a state of constant speed movement at the rotational speed of the power wheel corresponding to $I_2$. When the assisting luggage case is accelerated or decelerated due to the friction from the road surface, the user can apply an external force (forward or reverse assisted force) again, so that the moving speed of the assisting luggage can be adapted to the walking speed of the user, which benefits the experience of the luggage case.

In this embodiment, when the user exerts a positive assisted force, the assisting luggage case comprises one of the following states: $I_2>I_1$, and the assisting luggage case is accelerated forward; the assisting luggage case moves forward at a uniform speed with the power wheel speed corresponding to $I_2$; $I_2<I_1$, the luggage move forward with decelerated speed; $I_2=0$, the luggage is stopped from moving.

When the user exerts a reverse assisted force, the assisting luggage case comprises one of the following states: $I_2>I_1$, and the assisting luggage case is accelerated backward; the assisting luggage case moves backward at a uniform speed with the power wheel speed corresponding to $I_2$; $I_2<I_1$, the luggage move backward with decelerated speed; $I_2=0$, the luggage is stopped from moving.

When the assisting luggage case is in the first operating state (initial stationary state), $I_1=0$.

In this embodiment, the control system is set with a predetermined current value $I_0$; the assisting luggage case is changed from the initial stationary state to the second operating state after applying an external force by an external factor; when $I_2 \leq I_0$, the assisting luggage case, at this time a displacement occurs due to the external force, but the control system does not drive the power wheel to rotate, and the assisting luggage case does not move forward or backward. The control system sets the predetermined current value $I_0$, which can prevent the mis-operation behavior caused by the accidental contact to the luggage by external factors, and improve the safety of the assisting luggage case. It should be noted that the force caused by external force to the luggage case is generally small, which is insufficient to start the hub motor of the power wheel.

In this embodiment, the second operating state comprises: a state of forward movement, forward acceleration, forward deceleration, backward movement, backward acceleration, backward deceleration, uniform speed movement, or stop moving.

In the whole operating process of the assisting luggage case of the present application, the sensor respectively detects the first operating state and the second operating state before and after the external force is applied to the assisting luggage case at any time, correspondingly forming the first current The value $I_1$ and the second current value $I_2$; the control system analyzes and compares the first current value $I_1$ and the second current value $I_2$, and drives the power wheel of the assisting luggage case to rotate according to an analysis result. The operation control method is convenient to be operated and precise in control, which benefits the user experience.

In this embodiment, the operation control method of the assisting luggage in the assisting operating mode is listed, and the operation control method is not only applicable to the assisting luggage case, but also be applied to other powered and pushed walking tools, such as, electric strollers, electric wheelchairs or electric shopping carts. It is only necessary to adjust the structure and software of the original transportation tool and install the corresponding control system and sensor.

In another embodiment, the present application further provides a method for controlling the operation of the luggage, the difference is in that there is no need to provide a power switch on the case body, that is, the user does not need to turn on the power switch in step S1 (the assisting luggage case is always on standby mode), it is only necessary to set the control system with an electric motor starting current threshold value $I_{start}$ and a predetermined current value $I_0$ set to prevent the external factors from accidentally touching the assisting luggage, $I_{start}>I_0$.

When the user uses the assisting luggage case in this embodiment, and applies an external force to the assisting luggage case, the second operation parameter actually detected by the Hall sensor is less than or equal to the electric motor starting current threshold value $I_{start}$, and the assisting luggage case is in the non-assisting movement mode. The second operation parameter actually detected by the Hall sensor is greater than the electric motor starting current threshold value $I_{start}$, then the assisting luggage is in the assisting movement mode, which further improve the user experience.

Even if a second operating state occurs due to the luggage case is mis-operated by the external factors, the force generated by the accidental impact to the luggage case is generally small, which is not enough to start the hub motor of the power wheel, and $I_0<I_{start}$, It can further improve the operational safety of the luggage case.

The above embodiments are only used to illustrate the present application but not to limit the technical solutions described in the present application; therefore, although the present specification has been described in detail with reference to the above embodiments, those skilled in the art will understand that the present application may be modified or equivalently replaced, and all the technical solutions and improvements thereof without departing from the spirit and scope of the present application are intended to be included in the scope of the claims.

What is claimed is:

1. A smart luggage case, comprising:
a case body,
an auxiliary wheel, mounted on a bottom of the case body,
a power wheel, elevatably mounted on the bottom of the case body;
a swinging device, connected to the power wheel; and
a driving mechanism, configured to drive the swinging device to swing and elevate the power wheel;
wherein, the swinging device comprises
a first swinging piece,
a second swinging piece, pivotally connected to the first swinging piece, and
a resilient member, connected between the first swinging piece and the second swinging piece and configured to drive the second swinging piece to swing, relative to the first swinging piece, to a lower portion of the case body;
the driving mechanism is connected to the first swinging piece, and the power wheel is mounted on the second swinging piece;
wherein the swinging device is provided with a fine adjustment member for adjusting a relative swinging angle when the second swinging piece swings, relative to the first swinging piece, to the lower portion of the case body; and
the fine adjustment member comprises a bolt threadedly connected to the first swinging piece and configured to abut the second swinging piece, and the second swinging piece is provided with a resistant block located below a pivotal joint of the first swinging piece and the second swinging piece to allow the bolt to abut thereto.

2. The smart luggage case according to claim 1, wherein, the resilient member is located below the pivotal joint of the first swinging piece and the second swinging piece.

3. The smart luggage case according to claim 2, wherein, the first swinging piece is provided with a limitation member to restrict the second swinging piece from swinging, relative to the first swinging piece, to the lower portion of the case body, and the limitation member is located below the pivotal joint and above the resilient member.

4. The smart luggage case of any one according to claim 1, wherein, the driving mechanism comprises:
an electric motor, and
a rotating shaft connected to a output shaft of the electric motor;
one end of the rotating shaft is fixedly connected to the first swinging piece, the other end of the rotating shaft is connected to the electric motor output shaft; and the first swinging piece swings about the rotating shaft.

5. The smart luggage case according to claim 4, wherein, the first swinging piece comprises:
a main body portion, connected to the driving mechanism,
a rotating shaft connecting portion, fixed to the main body portion and connected to the rotating shaft,
a hinge portion, fixed to the main body portion and hinged to the second swinging piece, with the hinge portion swinging about the rotating shaft connecting portion, and
a lug portion, projecting downward from the main body portion and connected to the resilient member.

6. A smart luggage case, comprising:
a case body,
a power wheel, mounted on the case body,
a control system connected to the power wheel;
a tension bar, provided with a wireless controller signally connected to a control system and configured to control the power wheel,
a battery, connected to the control system;
an auxiliary wheel, mounted on a bottom of the case body;

a swinging device, configured to control elevation of the power wheel, and a driving mechanism configured to drive the swinging device;

wherein the swinging device comprises a first swinging piece, a second swinging piece pivotally connected to the first swinging piece, and a resilient member connected between the first swinging piece and the second swinging piece and configured to drive the second swinging piece to swing, relative to the first swinging piece, to a lower portion of the case body;

the driving mechanism is connected to the first swinging piece, and the power wheel is mounted on the second swinging piece;

the swinging device is provided with a fine adjustment member for adjusting a relative swinging angle when the second swinging piece swings, relative to the first swinging piece, to the lower portion of the case body; and the fine adjustment member comprises a bolt threadedly connected to the first swinging piece and configured to abut the second swinging piece, and the second swinging piece is provided with a resistant block located below a pivotal joint of the first swinging piece and the second swinging piece to allow the bolt to abut thereto.

7. The smart luggage case according to claim 6, wherein, the wireless controller comprises:

a button area, a touch sensing module, connected to the button area, a signal processing module, connected to the touch sensing module, and a wireless communication module connected to the signal processing module and signally connected to the control system.

8. The smart luggage case according to claim 7, wherein, the button area is a flexible button or a liquid crystal touch screen.

9. The smart luggage case according to claim 7, wherein, the wireless communication module comprises:

an ultra-wideband wireless communication module, a Bluetooth wireless communication module, an ultrasonic wireless communication module or an infrared wireless communication module.

10. The smart luggage case according to claim 6, wherein, the resilient member is located below the pivotal joint of the first swinging piece and the second swinging piece.

11. The smart luggage case according to claim 10, wherein, the first swinging piece is provided with a limitation member to restricting the second swinging piece from swinging to the lower portion of the case body in relative to the first swinging piece, and the limitation member is located below the pivotal joint and above the resilient member.

* * * * *